United States Patent
Malik et al.

(10) Patent No.: US 10,902,466 B2
(45) Date of Patent: Jan. 26, 2021

(54) METHODS AND SYSTEMS FOR A COMMUNICATIONS AND INFORMATION RESOURCE MANAGER

(71) Applicant: Facebook, Inc., Menlo Park, CA (US)

(72) Inventors: Dale Malik, Dunwoody, GA (US); Robert A. Koch, Norcross, GA (US); Peter Hill, Atlanta, GA (US); Richard A. Anderson, Alpharetta, GA (US)

(73) Assignee: FACEBOOK, INC., Menlo Park, CA (US)

(*) Notice: Subject to any disclaimer, the term of this patent is extended or adjusted under 35 U.S.C. 154(b) by 1131 days.

(21) Appl. No.: 14/448,725

(22) Filed: Jul. 31, 2014

(65) Prior Publication Data
US 2014/0344723 A1  Nov. 20, 2014

Related U.S. Application Data

(60) Continuation of application No. 14/323,973, filed on Jul. 3, 2014, now abandoned, which is a continuation
(Continued)

(51) Int. Cl.
*G06Q 30/02* (2012.01)
*G06F 16/958* (2019.01)
(Continued)

(52) U.S. Cl.
CPC ....... *G06Q 30/0257* (2013.01); *G06F 3/0482* (2013.01); *G06F 16/958* (2019.01); *G06F 21/62* (2013.01); *G06Q 10/107* (2013.01); *G06Q 10/109* (2013.01); *G06Q 30/02* (2013.01); *G06Q 30/0267* (2013.01); *G06Q 30/0269* (2013.01); *H04L 29/12169* (2013.01); *H04L 41/22* (2013.01); *H04L 51/04* (2013.01); *H04L 51/24* (2013.01); *H04L 51/36* (2013.01); *H04L 61/1576* (2013.01); *H04L 65/403* (2013.01);
(Continued)

(58) Field of Classification Search
USPC ....................................... 340/825.44
See application file for complete search history.

(56) References Cited

U.S. PATENT DOCUMENTS

| 4,266,098 A | 5/1981 | Novak |
| 4,703,423 A | 10/1987 | Bado et al. |

(Continued)

FOREIGN PATENT DOCUMENTS

| JP | 2000-105739 | 4/2000 |
| WO | WO 97/17774 | 5/1997 |
| WO | WO 03/056821 | 7/2003 |

OTHER PUBLICATIONS

U.S. Appl. No. 14/323,447, Jul. 25, 2016, Office Action.
(Continued)

*Primary Examiner* — Afaf Osman Bilal Ahmed
(74) *Attorney, Agent, or Firm* — Keller Jolley Preece

(57) ABSTRACT

Methods and systems are disclosed for managing the communications and information resources of a user. Identity information relating to the user is received. The user's preference for withholding an incoming communication is obtained. An entry is created in a message log for the withheld communication. The user is not notified of receipt of the withheld communication, yet receipt of the withheld communication is logged in the message log.

20 Claims, 17 Drawing Sheets

Related U.S. Application Data of application No. 11/638,546, filed on Dec. 13, 2006, now abandoned, which is a division of application No. 10/251,025, filed on Sep. 20, 2002, now Pat. No. 7,272,633, which is a continuation of application No. 09/966,703, filed on Sep. 28, 2001, now Pat. No. 7,313,617.

(51) Int. Cl.

| | | |
|---|---|---|
| *G06Q 10/10* | (2012.01) | |
| *H04L 29/12* | (2006.01) | |
| *H04L 12/58* | (2006.01) | |
| *H04M 3/22* | (2006.01) | |
| *H04M 3/436* | (2006.01) | |
| *H04M 3/53* | (2006.01) | |
| *G06F 21/62* | (2013.01) | |
| *H04L 12/24* | (2006.01) | |
| *H04L 29/08* | (2006.01) | |
| *G06F 3/0482* | (2013.01) | |
| *H04L 29/06* | (2006.01) | |
| *H04M 3/42* | (2006.01) | |
| *H04M 3/537* | (2006.01) | |
| *H04M 7/00* | (2006.01) | |
| *H04M 7/12* | (2006.01) | |

(52) U.S. Cl.
CPC .......... *H04L 67/32* (2013.01); *H04M 3/2218* (2013.01); *H04M 3/436* (2013.01); *H04M 3/5307* (2013.01); *H04L 67/2804* (2013.01); *H04L 69/329* (2013.01); *H04M 3/4211* (2013.01); *H04M 3/42059* (2013.01); *H04M 3/537* (2013.01); *H04M 7/0036* (2013.01); *H04M 7/0045* (2013.01); *H04M 7/0054* (2013.01); *H04M 7/128* (2013.01); *H04M 7/1235* (2013.01); *H04M 2203/2066* (2013.01); *H04M 2242/22* (2013.01); *H04Q 2213/13175* (2013.01); *H04Q 2213/13338* (2013.01); *H04Q 2213/13377* (2013.01)

(56) References Cited

U.S. PATENT DOCUMENTS

| | | |
|---|---|---|
| 4,706,242 A | 11/1987 | Harland |
| 4,850,007 A | 7/1989 | Marino et al. |
| 4,935,954 A | 6/1990 | Thompson et al. |
| 4,969,136 A | 11/1990 | Chamberlin et al. |
| 4,975,896 A | 12/1990 | D'Agosto et al. |
| 5,311,583 A | 5/1994 | Friedes et al. |
| 5,404,505 A | 4/1995 | Levinson |
| 5,436,965 A | 7/1995 | Grossman et al. |
| 5,570,417 A | 10/1996 | Byers |
| 5,592,470 A | 1/1997 | Rudrapatna et al. |
| 5,604,492 A | 2/1997 | Abdul-Halim |
| 5,608,786 A | 3/1997 | Gordon |
| 5,621,790 A | 4/1997 | Grossman et al. |
| 5,644,624 A | 7/1997 | Caldwell |
| 5,661,783 A | 8/1997 | Assis |
| 5,703,571 A * | 12/1997 | Cannon ................ G08B 5/229 340/7.21 |
| 5,708,775 A | 1/1998 | Nakamura |
| 5,802,510 A | 9/1998 | Jones |
| 5,812,654 A | 9/1998 | Anderson et al. |
| 5,818,438 A | 10/1998 | Howe et al. |
| 5,818,447 A | 10/1998 | Wolf et al. |
| 5,822,410 A | 10/1998 | McCausland et al. |
| 5,852,775 A | 12/1998 | Hidary |
| 5,872,841 A | 2/1999 | King et al. |
| 5,889,799 A | 3/1999 | Grossman et al. |
| 5,892,508 A | 4/1999 | Howe et al. |
| 5,909,589 A | 6/1999 | Parker et al. |
| 5,937,047 A | 8/1999 | Stabler |
| 5,943,417 A | 8/1999 | Cox et al. |
| 5,946,386 A | 8/1999 | Rogers |
| 5,966,437 A | 10/1999 | Cox et al. |
| 5,974,388 A | 10/1999 | Durham |
| 5,978,475 A | 11/1999 | Schneier et al. |
| 5,987,100 A | 11/1999 | Fortman et al. |
| 6,002,394 A | 12/1999 | Schein et al. |
| 6,014,135 A | 1/2000 | Fernandes |
| 6,023,700 A | 2/2000 | Owens et al. |
| 6,052,730 A | 4/2000 | Felciano et al. |
| 6,055,512 A | 4/2000 | Dean et al. |
| 6,065,047 A | 5/2000 | Carpenter et al. |
| 6,075,850 A | 6/2000 | Ali et al. |
| 6,084,628 A | 7/2000 | Sawyer |
| 6,088,588 A | 7/2000 | Osborne |
| 6,091,802 A | 7/2000 | Smith et al. |
| 6,097,942 A | 8/2000 | Laiho |
| 6,118,856 A | 9/2000 | Paarsmark et al. |
| 6,125,108 A | 9/2000 | Shaffer et al. |
| 6,128,624 A | 10/2000 | Papeirniak et al. |
| 6,133,853 A | 10/2000 | Obradovich et al. |
| 6,134,235 A | 10/2000 | Goldman et al. |
| 6,144,644 A * | 11/2000 | Bajzath ................ H04M 3/428 370/259 |
| 6,147,975 A | 11/2000 | Bowman-Amuah |
| 6,148,261 A | 11/2000 | Obradovich et al. |
| 6,148,329 A | 11/2000 | Meyer |
| 6,151,584 A | 11/2000 | Papeirniak et al. |
| 6,154,530 A | 11/2000 | Letellier |
| 6,157,709 A | 12/2000 | Lawser et al. |
| 6,167,119 A | 12/2000 | Bartholomew et al. |
| 6,182,142 B1 | 1/2001 | Win et al. |
| 6,185,433 B1 | 2/2001 | Lele et al. |
| 6,205,211 B1 | 3/2001 | Thomas et al. |
| 6,208,721 B1 | 3/2001 | Feinberg et al. |
| 6,216,104 B1 | 4/2001 | Moshfeghi et al. |
| 6,233,317 B1 | 5/2001 | Homan et al. |
| 6,236,768 B1 | 5/2001 | Rhodes |
| 6,237,027 B1 | 5/2001 | Namekawa |
| 6,247,043 B1 | 6/2001 | Bates et al. |
| 6,252,672 B1 | 6/2001 | Sugawara et al. |
| 6,253,188 B1 | 6/2001 | Witek et al. |
| 6,266,690 B1 | 7/2001 | Shankarappa et al. |
| 6,272,150 B1 | 8/2001 | Hrastar et al. |
| 6,272,537 B1 | 8/2001 | Kekic et al. |
| 6,282,275 B1 | 8/2001 | Gurbani |
| 6,301,245 B1 | 10/2001 | Luzeski et al. |
| 6,301,342 B1 | 10/2001 | Ander et al. |
| 6,304,635 B1 | 10/2001 | Iwani et al. |
| 6,308,328 B1 | 10/2001 | Bowcutt et al. |
| 6,317,485 B1 | 11/2001 | Homan et al. |
| 6,320,947 B1 | 11/2001 | Joyce et al. |
| 6,330,079 B1 | 12/2001 | Dugan et al. |
| 6,338,066 B1 | 1/2002 | Martin et al. |
| 6,339,639 B1 * | 1/2002 | Henderson ............ H04M 3/428 379/142.08 |
| 6,345,239 B1 | 2/2002 | Bowman-Amuah |
| 6,351,771 B1 | 2/2002 | Craddock et al. |
| 6,353,659 B1 | 3/2002 | VanRyzin et al. |
| 6,353,852 B1 | 3/2002 | Nestoriak et al. |
| 6,360,254 B1 | 3/2002 | Linden et al. |
| 6,385,311 B1 | 5/2002 | Bauer et al. |
| 6,400,810 B1 | 6/2002 | Skladman et al. |
| 6,404,762 B1 | 6/2002 | Luzeski et al. |
| 6,411,685 B1 | 6/2002 | O'Neal |
| 6,421,725 B1 | 7/2002 | Vermilyea et al. |
| 6,424,966 B1 | 7/2002 | Meyerzon et al. |
| 6,424,995 B1 | 7/2002 | Shuman |
| 6,430,177 B1 | 8/2002 | Luzeski et al. |
| 6,430,188 B1 | 8/2002 | Kadambi et al. |
| 6,434,747 B1 | 8/2002 | Khoo et al. |
| 6,445,682 B1 | 9/2002 | Weitz |
| 6,445,913 B1 | 9/2002 | Ezuriko |
| 6,453,353 B1 | 9/2002 | Win et al. |
| 6,459,782 B1 | 10/2002 | Bedrosian |
| 6,460,082 B1 | 10/2002 | Lumelsky et al. |
| 6,493,437 B1 | 12/2002 | Olshansky |
| 6,496,838 B1 | 12/2002 | Zamora-Mckelvy et al. |

(56) References Cited

U.S. PATENT DOCUMENTS

| | | |
|---|---|---|
| 6,502,242 B1 | 12/2002 | Howe et al. |
| 6,515,968 B1 | 2/2003 | Combar et al. |
| 6,518,984 B1 | 2/2003 | Maeckel et al. |
| 6,526,044 B1 | 2/2003 | Cookmeyer et al. |
| 6,529,954 B1 | 3/2003 | Cookmeyer et al. |
| 6,535,585 B1 | 3/2003 | Hanson et al. |
| 6,556,666 B1 | 4/2003 | Beyda et al. |
| 6,560,633 B1 | 5/2003 | Roberts |
| 6,564,261 B1 | 5/2003 | Gudjonsson et al. |
| 6,567,982 B1 | 5/2003 | Howe et al. |
| 6,570,855 B1 | 5/2003 | Kung et al. |
| 6,574,678 B1 | 6/2003 | Nykaned et al. |
| 6,594,255 B1 | 7/2003 | Neuman |
| 6,608,637 B1 | 8/2003 | Beaton et al. |
| 6,609,253 B1 | 8/2003 | Swix et al. |
| 6,611,501 B1 | 8/2003 | Owen et al. |
| 6,615,184 B1 | 9/2003 | Hicks |
| 6,615,241 B1 | 9/2003 | Miller et al. |
| 6,625,258 B1 | 9/2003 | Ram et al. |
| 6,631,186 B1 | 10/2003 | Adams et al. |
| 6,631,402 B1 | 10/2003 | Devine |
| 6,633,630 B1 | 10/2003 | Owens et al. |
| 6,640,230 B1 | 10/2003 | Alexander et al. |
| 6,640,241 B1 | 10/2003 | Ozzie et al. |
| 6,665,378 B1 | 12/2003 | Spielman et al. |
| 6,699,007 B2 | 3/2004 | Huang et al. |
| 6,701,348 B2 | 3/2004 | Sommerer |
| 6,708,202 B1 | 3/2004 | Shuman et al. |
| 6,711,154 B1 | 3/2004 | O'Neal |
| 6,717,513 B1 | 4/2004 | Sandelman et al. |
| 6,721,748 B1 | 4/2004 | Knight et al. |
| 6,731,927 B1 | 5/2004 | Stern et al. |
| 6,735,286 B1 | 5/2004 | Hansen et al. |
| 6,738,462 B1 | 5/2004 | Brunson |
| 6,741,697 B2 | 5/2004 | Benson et al. |
| 6,745,229 B1 | 6/2004 | Gobin et al. |
| 6,747,970 B1 | 6/2004 | Lamb et al. |
| 6,748,056 B1 | 6/2004 | Capriotti et al. |
| 6,754,181 B1 | 6/2004 | Elliott et al. |
| 6,757,732 B1 | 6/2004 | Sollee et al. |
| 6,760,601 B1 | 7/2004 | Suoknunti |
| 6,760,727 B1 | 7/2004 | Schroeder et al. |
| 6,763,102 B1 | 7/2004 | Chen |
| 6,766,369 B1 | 7/2004 | Haitsuka et al. |
| 6,768,722 B1 | 7/2004 | Katseff et al. |
| 6,772,188 B1 | 8/2004 | Cloutier |
| 6,782,086 B2 | 8/2004 | Clapper |
| 6,785,266 B2 | 8/2004 | Swartz |
| 6,785,379 B1 | 8/2004 | Rogers |
| 6,788,926 B1 | 9/2004 | Frangione et al. |
| 6,798,868 B1 | 9/2004 | Montgomery et al. |
| 6,804,707 B1 | 10/2004 | Ronning |
| 6,804,716 B1 | 10/2004 | Koch et al. |
| 6,806,977 B1 | 10/2004 | Freeny et al. |
| 6,807,423 B1 | 10/2004 | Armstrong et al. |
| 6,807,574 B1 | 10/2004 | Partovi et al. |
| 6,816,469 B1 | 11/2004 | Kung et al. |
| 6,820,204 B1 | 11/2004 | Desai et al. |
| 6,826,639 B2 | 11/2004 | Pasumansky |
| 6,829,233 B1 | 12/2004 | Gilboy |
| 6,834,195 B2 | 12/2004 | Brandenberg et al. |
| 6,839,414 B1 | 1/2005 | Enzmann et al. |
| 6,842,767 B1 | 1/2005 | Partovi et al. |
| 6,853,711 B2 | 2/2005 | Brisebois et al. |
| 6,857,024 B1 | 2/2005 | Chen |
| 6,879,995 B1 | 4/2005 | Chinta et al. |
| 6,882,709 B1 | 4/2005 | Sherlock |
| 6,892,083 B2 | 5/2005 | Shostak |
| 6,895,426 B1 | 5/2005 | Cotright et al. |
| 6,895,559 B2 | 5/2005 | Forder |
| 6,904,137 B2 | 6/2005 | Brandt et al. |
| 6,910,186 B2 | 6/2005 | Kim |
| 6,914,967 B1 | 7/2005 | Baca et al. |
| 6,917,610 B1 | 7/2005 | Kung |
| 6,920,208 B1 | 7/2005 | Rosen |
| 6,920,213 B2 | 7/2005 | Pershan |
| 6,928,154 B1 | 8/2005 | Cheaito |
| 6,940,958 B2 | 9/2005 | Clapper |
| 6,947,979 B1 | 9/2005 | Pon |
| 6,948,838 B2 | 9/2005 | Ruthfield et al. |
| 6,961,751 B1 | 11/2005 | Bates et al. |
| 6,973,556 B2 | 12/2005 | Milligan et al. |
| 6,980,982 B1 | 12/2005 | Geddes et al. |
| 6,981,023 B1 | 12/2005 | Hamilton et al. |
| 6,981,040 B1 | 12/2005 | Konig et al. |
| 6,981,223 B2 | 12/2005 | Becker |
| 6,988,128 B1 | 1/2006 | Alexander et al. |
| 7,007,085 B1 | 2/2006 | Malik |
| 7,031,961 B2 | 4/2006 | Pitkow et al. |
| 7,062,535 B1 | 6/2006 | Stark |
| 7,088,805 B1 | 8/2006 | Moore |
| 7,092,936 B1 | 8/2006 | Alonso et al. |
| 7,096,232 B2 | 8/2006 | Doss |
| 7,107,275 B2 | 9/2006 | Quinn et al. |
| 7,117,504 B2 | 10/2006 | Smith et al. |
| 7,130,891 B2 | 10/2006 | Bernardin et al. |
| 7,171,448 B1 | 1/2007 | Danielson et al. |
| 7,213,005 B2 | 5/2007 | Mourad et al. |
| 7,225,409 B1 | 5/2007 | Schnarel et al. |
| 7,263,505 B1 | 8/2007 | Forlai |
| 7,272,633 B2 | 9/2007 | Malik |
| 7,313,617 B2 | 12/2007 | Malik |
| 7,325,032 B2 | 1/2008 | Zuberec et al. |
| 7,441,027 B2 | 10/2008 | Malik |
| 7,472,187 B2 | 12/2008 | Malik |
| 7,496,189 B2 | 2/2009 | Clarisse et al. |
| 7,525,955 B2 | 4/2009 | Velez-Rivera et al. |
| 7,778,399 B2 | 8/2010 | Ambrose |
| 7,860,804 B2 | 12/2010 | Littrell |
| 7,929,951 B2 | 4/2011 | Stevens |
| 8,023,622 B2 | 9/2011 | Timmins et al. |
| 8,271,591 B2 | 9/2012 | Malik |
| 8,341,018 B2 | 12/2012 | Malik |
| 8,423,412 B2 | 4/2013 | Vierl |
| 8,554,693 B2 | 10/2013 | Littrell |
| 8,554,718 B2 | 10/2013 | Gage |
| 8,560,673 B2 | 10/2013 | Malik |
| 2001/0013050 A1 | 8/2001 | Shah |
| 2001/0013069 A1 | 8/2001 | Shah |
| 2001/0027478 A1 | 10/2001 | Meier |
| 2001/0029468 A1 | 10/2001 | Yamaguchi |
| 2002/0029163 A1 | 3/2002 | Joao |
| 2002/0055924 A1 | 5/2002 | Liming |
| 2002/0059117 A1 | 5/2002 | Yoch et al. |
| 2002/0069048 A1 | 6/2002 | Sadhwani et al. |
| 2002/0073142 A1 | 6/2002 | Moran |
| 2002/0076015 A1 | 6/2002 | Norwitz et al. |
| 2002/0078151 A1 | 6/2002 | Wickam et al. |
| 2002/0091829 A1 | 7/2002 | Wood |
| 2002/0092021 A1 | 7/2002 | Yap et al. |
| 2002/0098849 A1 | 7/2002 | Bloebaum et al. |
| 2002/0099657 A1 | 7/2002 | Black et al. |
| 2002/0099775 A1 | 7/2002 | Gupta et al. |
| 2002/0099777 A1 | 7/2002 | Gupta et al. |
| 2002/0111813 A1 | 8/2002 | Capps |
| 2002/0124057 A1 | 9/2002 | Besprosvan |
| 2002/0174110 A1 | 11/2002 | Smith |
| 2002/0174188 A1 | 11/2002 | Clark et al. |
| 2002/0180776 A1 | 12/2002 | Fishman |
| 2002/0184329 A1 | 12/2002 | Chen et al. |
| 2002/0194274 A1 | 12/2002 | Kroeger |
| 2003/0009530 A1 | 1/2003 | Philonenko et al. |
| 2003/0014553 A1 | 1/2003 | Zhao |
| 2003/0023757 A1 | 1/2003 | Ishioka et al. |
| 2003/0065778 A1 | 4/2003 | Malik |
| 2003/0087652 A1 | 5/2003 | Simon |
| 2003/0156134 A1 | 8/2003 | Kim |
| 2004/0091091 A1 | 5/2004 | Maruyama |
| 2004/0125133 A1 | 7/2004 | Pea et al. |
| 2004/0236619 A1 | 11/2004 | Gundersen et al. |
| 2004/0254999 A1 | 12/2004 | Bulleit et al. |
| 2005/0038863 A1 | 2/2005 | Onyon et al. |
| 2005/0120305 A1 | 6/2005 | Engstrom et al. |
| 2005/0149487 A1 | 7/2005 | Celik |

(56) References Cited

U.S. PATENT DOCUMENTS

| | | |
|---|---|---|
| 2005/0188043 A1 | 8/2005 | Cortright et al. |
| 2005/0204030 A1 | 9/2005 | Koch et al. |
| 2006/0062205 A1 | 3/2006 | Doherty et al. |
| 2007/0100967 A1 | 5/2007 | Smith |
| 2007/0130338 A1 | 6/2007 | Malik |
| 2012/0078725 A1 | 3/2012 | Maitra et al. |
| 2013/0138513 A1 | 5/2013 | Malik |

OTHER PUBLICATIONS

U.S. Appl. No. 14/323,973, Jun. 9, 2016, Office Action.
U.S. Appl. No. 11/638,546, Mar. 22, 2016, Office Action.
U.S. Appl. No. 14/323,447, Jan. 5, 2016, Office Action.
U.S. Appl. No. 10/184,670, Jul. 27, 2017, Office Action.
U.S. Appl. No. 14/323,447, Jul. 28, 2017, Office Action.
U.S. Appl. No. 10/184,670, Jan. 13, 2017, Office Action.
U.S. Appl. No. 11/638,546, Mar. 28, 2017, Office Action.
U.S. Appl. No. 14/325,053, Apr. 3, 2017, Office Action.
U.S. Appl. No. 14/325,039, Apr. 5, 2017, Office Action.
U.S. Appl. No. 14/328,509, Apr. 5, 2017, Office Action.
U.S. Appl. No. 14/328,516, Apr. 5, 2017, Office Action.
U.S. Appl. No. 10/184,670, Dec. 29, 2014, Office Action.
U.S. Appl. No. 14/323,447, Jan. 16, 2015, Office Action.
U.S. Appl. No. 14/323,464, Jan. 16, 2015, Office Action.
U.S. Appl. No. 14/323,472, Jan. 15, 2015, Office Action.
U.S. Appl. No. 14/323,973, filed Jul. 3, 2014, Malik et al.
U.S. Appl. No. 14/325,039, filed Jul. 7, 2014, Malik et al.
U.S. Appl. No. 14/325,053, filed Jul. 7, 2014, Malik et al.
U.S. Appl. No. 14/448,725, filed Jul. 31, 2014, Malik et al.
U.S. Appl. No. 14/323,447, filed Jul. 3, 2014, Malik et al.
U.S. Appl. No. 14/323,464, filed Jul. 3, 2014, Malik et al.
U.S. Appl. No. 14/323,969, filed Jul. 3, 2014, Malik et al.
U.S. Appl. No. 14/328,509, filed Jul. 10, 2014, Malik et al.
U.S. Appl. No. 14/328,516, filed Jul. 10, 2014, Malik et al.
"Microsoft Outlook 2000 Sr-1 Readme File," www.microsoft.com/assistance/offhelp/off2000/outlook/outlhlp9/html/olread9.htm, as of Apr. 30, 2002.
"Microsoft Outlook version 2002 (included in office XP)," Microsoft Outlook Product Guide, pp. 1-11.
"Microsoft Office," Microsoft Outlook 2000 Product Enhancements Guide, Oct. 1998.
Microsoft Outlook 2000 "About" screen capture printout (1 page).
Microsoft Outlook Programming, webpage printout (5 pages) retrieved from www.outlookcode.com, Apr. 17, 2006.
Gordon Padwick and Helen Ferddema, "Special Edition Using Microsoft Outlook", May 12, 1999.
Kox, Klass, Mobile Contextual Advertising: HAIT Master Thesis series nr. 08-005, pp. 1-27, Dec. 2008.
"Delivering dollars on demand: cable industry weighs different models to build revenue," Nov. 3, 2003; Braodcasting & Cable, v133, n44, p. S3, 8pp.
VH1, "Pop-Up Video," 1980s, VH1.com, www.vh1.com/shows/dyn/pop_up_video/series_about.html, pp. 1-2, retrieved May 2, 2007.
VH1, "Pop-Up Video," Oct. 26, 2002, VH1.com, web.archive.org/web/20021026183153/http://www.vh1.com/shows/dyn/pop_up_video/series_about.html, p. 1.
U.S. Appl. No. 09/966,703, Nov. 17, 2005, Office Action.
U.S. Appl. No. 09/966,703, May 26, 2006, Office Action.
U.S. Appl. No. 09/966,703, May 2, 2007, Office Action.
U.S. Appl. No. 09/966,703, Oct. 25, 2007, Notice of Allowance.
U.S. Appl. No. 10/109,909, Jul. 15, 2004, Office Action.
U.S. Appl. No. 10/109,909, Jan. 24, 2005, Office Action.
U.S. Appl. No. 10/109,909, Jul. 21, 2005, Notice of Allowance.
U.S. Appl. No. 10/184,588, Nov. 30, 2005, Office Action.
U.S. Appl. No. 10/184,588, Aug. 11, 2006, Office Action.
U.S. Appl. No. 10/184,588, Apr. 9, 2007, Office Action.
U.S. Appl. No. 10/184,588, Sep. 13, 2007, Office Action.
U.S. Appl. No. 10/184,588, Jan. 9, 2008, Office Action.
U.S. Appl. No. 10/184,588, Aug. 4, 2008, Office Action.
U.S. Appl. No. 10/184,588, Dec. 10, 2008, Office Action.
U.S. Appl. No. 10/184,588, May 21, 2009, Office Action.
U.S. Appl. No. 10/184,588, Nov. 10, 2009, Office Action.
U.S. Appl. No. 10/184,588, May 7, 2010, Office Action.
U.S. Appl. No. 10/184,588, Oct. 13, 2010, Office Action.
U.S. Appl. No. 10/184,588, Aug. 20, 2012, Notice of Allowance.
U.S. Appl. No. 10/184,670, Jun. 9, 2008, Office Action.
U.S. Appl. No. 10/184,670, Nov. 18, 2008, Office Action.
U.S. Appl. No. 10/184,670, Apr. 1, 2009, Office Action.
U.S. Appl. No. 10/184,670, Oct. 23, 2009, Office Action.
U.S. Appl. No. 10/184,670, May 26, 2010, Office Action.
U.S. Appl. No. 10/184,670, Nov. 24, 2010, Office Action.
U.S. Appl. No. 10/184,670, Aug. 14, 2013, Office Action.
U.S. Appl. No. 10/184,670, Nov. 26, 2013, Office Action.
U.S. Appl. No. 10/251,025, Nov. 4, 2005, Office Action.
U.S. Appl. No. 10/251,025, Apr. 24, 2006, Office Action.
U.S. Appl. No. 10/251,025, Jan. 5, 2007, Office Action.
U.S. Appl. No. 10/251,025, Jul. 5, 2007, Notice of Allowance.
U.S. Appl. No. 10/251,025, Jul. 20, 2007, Notice of Allowance.
U.S. Appl. No. 10/739,599, May 30, 2006, Office Action.
U.S. Appl. No. 10/739,599, Dec. 19, 2006, Office Action.
U.S. Appl. No. 10/739,599, May 9, 2007, Office Action.
U.S. Appl. No. 10/739,599, Jun. 28, 2007, Office Action.
U.S. Appl. No. 10/739,599, Mar. 17, 2008, Office Action.
U.S. Appl. No. 10/739,599, Aug. 19, 2010, Notice of Allowance.
U.S. Appl. No. 10/997,305, May 2, 2006, Office Action.
U.S. Appl. No. 10/997,305, Oct. 17, 2006, Office Action.
U.S. Appl. No. 10/997,305, Apr. 10, 2007, Office Action.
U.S. Appl. No. 10/997,305, Dec. 18, 2007, Office Action.
U.S. Appl. No. 10/997,305, May 19, 2008, Office Action.
U.S. Appl. No. 10/997,305, Oct. 6, 2008, Notice of Allowance.
U.S. Appl. No. 11/236,907, May 2, 2006, Office Action.
U.S. Appl. No. 11/236,907, Oct. 19, 2006, Office Action.
U.S. Appl. No. 11/236,907, Mar. 6, 2007, Office Action.
U.S. Appl. No. 11/236,907, Aug. 24, 2007, Office Action.
U.S. Appl. No. 11/236,907, Jan. 25, 2008, Office Action.
U.S. Appl. No. 11/236,907, Aug. 7, 2008, Notice of Allowance.
U.S. Appl. No. 11/638,546, Apr. 10, 2009, Office Action.
U.S. Appl. No. 11/638,546, Oct. 8, 2009, Office Action.
U.S. Appl. No. 11/638,546, Feb. 6, 2012, Office Action.
U.S. Appl. No. 11/638,546, Jul. 18, 2012, Office Action.
U.S. Appl. No. 11/638,546, Aug. 2, 2013, Office Action.
U.S. Appl. No. 11/638,546, Feb. 10, 2014, Office Action.
U.S. Appl. No. 11/900,153, Dec. 3, 2010, Office Action.
U.S. Appl. No. 11/900,153, Apr. 21, 2011, Office Action.
U.S. Appl. No. 11/900,153, Jun. 21, 2012, Notice of Allowance.
U.S. Appl. No. 12/335,792, May 23, 2011, Office Action.
U.S. Appl. No. 12/335,792, Apr. 20, 2012, Office Action.
U.S. Appl. No. 12/335,792, Oct. 2, 2012, Office Action.
U.S. Appl. No. 12/335,792, Jun. 20, 2013, Notice of Allowance.
U.S. Appl. No. 12/948,962, Dec. 5, 2012, Office Action.
U.S. Appl. No. 12/948,962, Jun. 12, 2013, Notice of Allowance.
U.S. Appl. No. 13/687,068, Jan. 2, 2014, Office Action.
U.S. Appl. No. 13/687,068, Oct. 7, 2014, Office Action.
U.S. Appl. No. 10/184,670, Jul. 9, 2015, Office Action.
U.S. Appl. No. 11/638,546, Jul. 13, 2015, Office Action.
U.S. Appl. No. 13/687,068, Jun. 24, 2015, Office Action.
U.S. Appl. No. 14/323,447, Jun. 24, 2015, Office Action.
U.S. Appl. No. 14/323,464, Jun. 25, 2015, Office Action.
U.S. Appl. No. 14/323,472, Jun. 25, 2015, Office Action.
U.S. Appl. No. 13/687,068, Aug. 24, 2018, Office Action.
U.S. Appl. No. 14/323,464, Apr. 23, 2018, Office Action.
U.S. Appl. No. 14/325,053, Aug. 28, 2018, Office Action.
U.S. Appl. No. 14/325,039, Mar. 14, 2018, Office Action.
U.S. Appl. No. 14/325,039, Jun. 16, 2020, Office Action.
U.S. Appl. No. 14/328,509, Aug. 20, 2020, Notice of Allowance.
U.S. Appl. No. 14/323,464, May 17, 2019, Notice of Allowance.
U.S. Appl. No. 14/325,053, Apr. 25, 2019, Office Action.
U.S. Appl. No. 14/328,516, May 24, 2019, Office Action.
U.S. Appl. No. 14/323,464, Sep. 11, 2018, Office Action.
U.S. Appl. No. 14/325,039, Oct. 4, 2018, Office Action.
U.S. Appl. No. 14/328,509, Sep. 7, 2018, Office Action.

(56) References Cited

OTHER PUBLICATIONS

U.S. Appl. No. 14/328,516, Sep. 27, 2018, Office Action.
U.S. Appl. No. 11/638,546, Feb. 16, 2018, Office Action.
U.S. Appl. No. 13/687,068, Jan. 29, 2018, Office Action.
U.S. Appl. No. 14/323,464, Dec. 28, 2017, Office Action.
U.S. Appl. No. 14/325,053, Dec. 13, 2017, Office Action.
U.S. Appl. No. 14/328,509, Dec. 13, 2017, Office Action.
U.S. Appl. No. 14/328,516, Dec. 13, 2017, Office Action.
U.S. Appl. No. 14/325,039, Dec. 19, 2019, Office Action.

* cited by examiner

METHODS AND SYSTEMS FOR A COMMUNICATIONS AND INFORMATION RESOURCE MANAGER

CROSS-REFERENCE TO RELATED APPLICATIONS

The present application is a continuation of U.S. patent application Ser. No. 14/323,973, filed Jul. 3, 2014, which is a continuation of U.S. patent application Ser. No. 11/638,546, filed Dec. 13, 2006 which is a division of U.S. patent application Ser. No. 10/251,025, filed Sep. 20, 2002 now issued as U.S. Pat. No. 7,272,633, which is a continuation of U.S. patent application Ser. No. 09/966,703, filed on Sep. 28, 2001 now issued as U.S. Pat. No. 7,313,617. Each of the aforementioned patent(s) and application(s) is hereby incorporated by reference in its entirety.

BACKGROUND

The exemplary embodiments relate to communications and information management, and particularly, to the management of a user's communications through a resource manager that may be implemented on a user's computer, personal digital assistant, or other unit or device.

To stay in touch with others, a user may accumulate a number of communications devices, services, and a variety of information resources. With respect to devices, a user may have a telephone (also referred to as a wireline or landline unit). The user also may have a wireless unit such as a mobile telephone or cell telephone. Each of the telephones (wireless or wireline) may have one or more voice mail services, messaging systems, or accounts associated with it. In addition, the user may have one or more other devices or units for specific types of communications such as a pager (including an interactive pager (ipager)) for pages and other communications. Plus, a user may have a facsimile (fax) machine(s) for faxes. Further, a user may have a computer or other device including an electronic mail (e-mail), an instant messaging, or other communications services. The computer or other device may be used for communications over local or global networks, and may allow the user to participate in chat rooms, to conduct research, to receive news and updates, and to engage in similar activities. Thus, it is not unusual for a user to have eight or more communications devices and one or more communications services associated with each device. Of course, other factors (such as the user's family, friends, communications style) may increase or decrease the number of the user's communications devices and services.

To stay in touch with others, with respect to information resources, a user has much more available to him or her than just telephone directories or information from the local library. In fact, information from telephone directories, libraries, and other sources may be accessible in many ways such as through the use of directory assistance, fax delivery, or computer on-line services. A user may obtain a vast amount of information on myriad topics from a data network or through a global information data network such as the Internet.

Given the many communications devices a user may accumulate, the many communications services the user may access, and the vast amount of information available to the user through various sources, a user may find it overwhelming to efficiently organize and utilize the devices, services, and information resources. Accordingly, there is a need for methods and systems that manage a user's communications and information resources.

SUMMARY

The communications and information resource (CIR) manager provides methods and systems for managing the communications and information resources of a user. Advantageously, the CIR manager may function as a "super" manager of communications features and services. Through its management, the CIR manager provides the user with improved tools related to communications.

The CIR manager may be implemented in or through use of the user's personal computer (PC). Through the user's PC or otherwise, the CIR manager may be functionally connected and/or interface to various communications elements, networks, services, or systems depending on the communications activities of the user. For example, the CIR manager may be functionally connected to a telecommunications network (such as the public switched telephone network (PSTN) and/or wireless networks) for telecommunications services such as telephone calls, wireless calls, pages, faxes, and the like. In particular, the CIR manager may be functionally connected to and/or interface with an element of or on a telecommunications network such as a telecommunications manager.

In addition, the CIR manager may be functionally connected to a local, wide area, and/or global data communications network (such as the Internet). In particular, the CIR manager may be functionally connected to a data network that includes an electronic mail (e-mail) system for e-mail services such as electronic mail messages, that includes an instant messaging system allowing the user to send and receive instant messages, and that allows the user to participate in, keep track of, log, monitor, and engage or direct other activities relating to other types of communications including participation in chat rooms, game playing, on-line shopping, e-commerce, and the like. Similarly, the CIR manager may be connected to a telecommunications network and/or a data communications network that includes a voice mail system for voice mail services such as voice mail messages, and the like.

To connect to and/or interface with the various communications elements or systems, the CIR manager may include and/or may have access to user data, which also may be referred to as identification information. For example, the user data may include details related to the configurations of the various services or systems available to the user. Further, the user data may include details related to the personal preferences of data display or identity of the user such as a personal identification number (PIN) or the like.

The CIR manager may be configured to manage the user data so as to keep it as current as possible. Thus, the CIR manager may monitor the gateway and telecom manager for new identity information about the user or for changed identity information. If the CIR manager finds new or changed identity information, then the CIR manager may retrieve such information and store the information in addition or in place of the original information.

With connections to various communications elements, the CIR manager manages the communications of the user. The term "communication" is used synonymously herein with the term "message", and may include a telephone message, a message from a wireless unit, a voice mail, an e-mail, a page, a fax, an instant message, a chat room message, or other communication. In addition, the terms "communication" and "message" may refer to part or all of a communications session of a user. For example, a user may participate in a communications session such as a teleconference, a video-conference, an exchange of instant messages, a chat in a chat room, or the like.

The CIR manager may receive and display communications or data related to communications of the user. The CIR manager may respond to instructions from the user with respect to data and/or communications. For example, with respect to data and/or communications, the CIR manager may take the following actions: receive, display, announce, delete, store, forward, copy, log, flag, monitor, tabulate, play, create, or reply among other actions related to data or communications. Further, the CIR manager allows the user to receive, view, listen, monitor, or to take similar action with respect to the data and/or a communication in a specified and/or preselected format, and then to store, forward, monitor, copy, or reply to the data and/or communication in the same and/or a different format.

The CIR manager may provide the user with an indication of a receipt of data about a communication received for the user. For example, the CIR manager may cause an icon or other information to appear on the display screen of the user's computer to indicate the receipt of data about a communication received for the user. The CIR manager may be configured to automatically respond to receipt of data about a communication received for the user with some reply or response to the communication. Alternatively, the CIR manager may provide the user with an indication of receipt of the data, and request the user for instructions on whether or not to respond to the communication. For example, the CIR manager may provide the user with an option of sending a standard response or a selected response. The standard response may alert the communicator of the communication that the message has been received, or that some action may or may not be taken with respect to the message. A selected response may be created by the user or may be created from canned information selected by the user. Canned information may include a response such as the following:

Contact me at a later time;
Contact me at the following telephone number—NPA-NXX-XXXX; and/or
I am on vacation.

In addition to making data about a communication and the communication available to the user, the CIR manager may make information related to the data or the received communications available to the user. For example, assume a user receives an e-mail from a friend. The CIR manager may be configured to make any communications to or from the friend available to the user. The CIR manager may store such related information and obtain it as appropriate. Alternatively, the CIR manager may obtain the related information from the telecom manager, the gateway, or elsewhere.

The CIR manager may be configured to include a message log. The message log may have entries corresponding respectively to communications of the user. Each entry may include information associated with the communication such as a name of the communicator, address or telephone number of the communicator, date/time of the communication, length of the communication, type of communication, subject of the communication, etc. An entry may be created from data received with respect to a communication received for the user. In addition, each entry may include the substance of the communication or the entry may have some information such as a link or other connection to the substance.

Advantageously, the entries in the message log of the CIR manager allow a user to keep track of generally all of the user's communications. For example, the message log may include entries relating to telephone calls, calls from wireless units, voice mail messages, pages, facsimile transmissions, or electronic mail messages. In addition, the message log may include entries relating to other types of communications of the user such as instant messages, chat room messages, etc. Further, the message log may include entries relating to communications that have been placed in attempts to reach the user. For example, the message log may include an entry for a telephone call to the user that had gone unanswered whether for the user's line being busy or for other reasons. As another example, the message log may include an entry for a call from a wireless unit that had gone unanswered for whatever reason. Thus, the message log creates a display of entries for the user such that the user may keep track of almost all communications relating to the user including communication attempts with the user.

The CIR manager may refer to the message log in retrieving information related to a communication received for the user. For example, assume a user receives data regarding an e-mail message from a friend of the user. The CIR manager may check the message log for entries from or relating to the friend of the user. The CIR manager may carry out the check by treating an entry in the message log as related information to the data on a received communication when the data includes a name or an address in common with the name or the address in the entry. If the CIR manager finds an entry in the message log that constitutes related information, then the CIR manager makes the entry available to the user.

The CIR manager may be configured to include one or more directories. A directory may be a directory customized for the user or a directory may be standard such as a telephone or other directory. The CIR manager may manage the information in the directory to keep it as current as possible. For example, in response to receipt of data on a received communication for the user, the data of the received communication may be checked against the directory. The data of the received communication may match the directory. If the data on the received communication is not included in the directory, the data on the received communication may be added to the directory. If the data on the received communication is different from or changed with respect to information in the directory, then the different or changed data may be entered or substituted into the directory.

The CIR manager may be configured to include one or more calendars. A calendar may be customized for the user or a calendar may be a standard calendar. The calendar may include scheduled activities of the user. The scheduled activities of the user may relate to occasions such as conferences, meetings, appointments, etc. The scheduled activities also may include notes or other reminders entered by the user in the calendar. For example, a scheduled activity may include a notation of a birthday, anniversary, holiday, or other event. Also, a scheduled activity may include a due date such as a project completion date, reminders, etc.

The CIR manager may use the information in the calendar to provide information to the user. For example, the CIR manager may receive data on a received communication for the user. The data may be checked against the scheduled activities or other elements of the calendar. The data of the received communication may match a scheduled activity or another element of the calendar. If the data on the received communication checks positively against a scheduled activity or other element of the calendar, then the scheduled activity or other element may be categorized as information related to the received communication. As such, the scheduled activity or other element may be made available to the user in connection with the data on the received communication or in connection with the communication.

An exemplary embodiment of the inventions implements the CIR manager through the use of a computer program stored on a computer-readable medium and used in a computer. A user may access the CIR manager through the use of a computer such as a personal computer (PC). For example, an icon or other graphic device may be created by the computer program for display on the desktop presented on the monitor of the user's computer. Typically, the computer program implementing the CIR manager is a persistent desktop presence. When the user activates the icon of the CIR manager, an initial screen of the graphic user interface (GUI) is displayed to the user. The GUI may include myriad screens for displaying information to the user, for displaying communications and/or data about the communications to the user, for displaying information about the user such as user data, for receiving information from the user, for reporting on actions to the user, and for similar information.

DETAILED DESCRIPTION

The exemplary embodiments relate to the management of communications and of information resources available to the user. Advantageously, the inventions may function as a "super" manager with respect to the communications devices, services, and systems of the user. In particular, the inventions may function to centralize communications activities and information such that the user does not have to (but may) use multiple communications devices. For example, the inventions may be used to keep a log of all types of communications related to the user—whatever the device, whatever the service, whatever the network. Of course, specialized logs are also possible such as a log of all received messages including telephone calls, e-mails, instant messages, chat room conversations, faxes, pages, and similar communications.

Another advantage is that the user does not have to check or use each type of device for its own type of messages. Yet another advantage is that the inventions may obtain the necessary information from resources including third party resources so as to facilitate communications and information gathering activities of the user. With the inventions, the user is provided with a centralized, efficient, and user-friendly way to handle communications activities including ways to receive, view, listen to, play, respond to, store, log, monitor, delete, copy, forward, obtain, create, and to take other actions. Moreover, the inventions provide the user with a personalized management of communications and information resources.

In addition, in managing the communications and information resources of the user, the inventions may provide the user with one or more of the following features and advantages:

Recognition of the user and of others as authorized by the user;

Remembrance and implementation of authorized users' preferences;

Aid in finding information and resources;

Information related to authorized users' activities and communications including call management and detail;

Service set-ups, configurations, changes, deletions, additions, updates, and synchronizations;

Maintenance of user account and preference information, logs, activity logs, schedules, calendars, general directories, personal directories, and the like;

Unified messaging including notice to the user relating to communications and/or other actions; and Suggestions, help, updates, reminders, warnings, alerts, and other comments.

The inventions conveniently may integrate the features described above pursuant to a user's preferences so as to provide efficient, organized, and user-friendly communications and information resource management.

Figure 1:
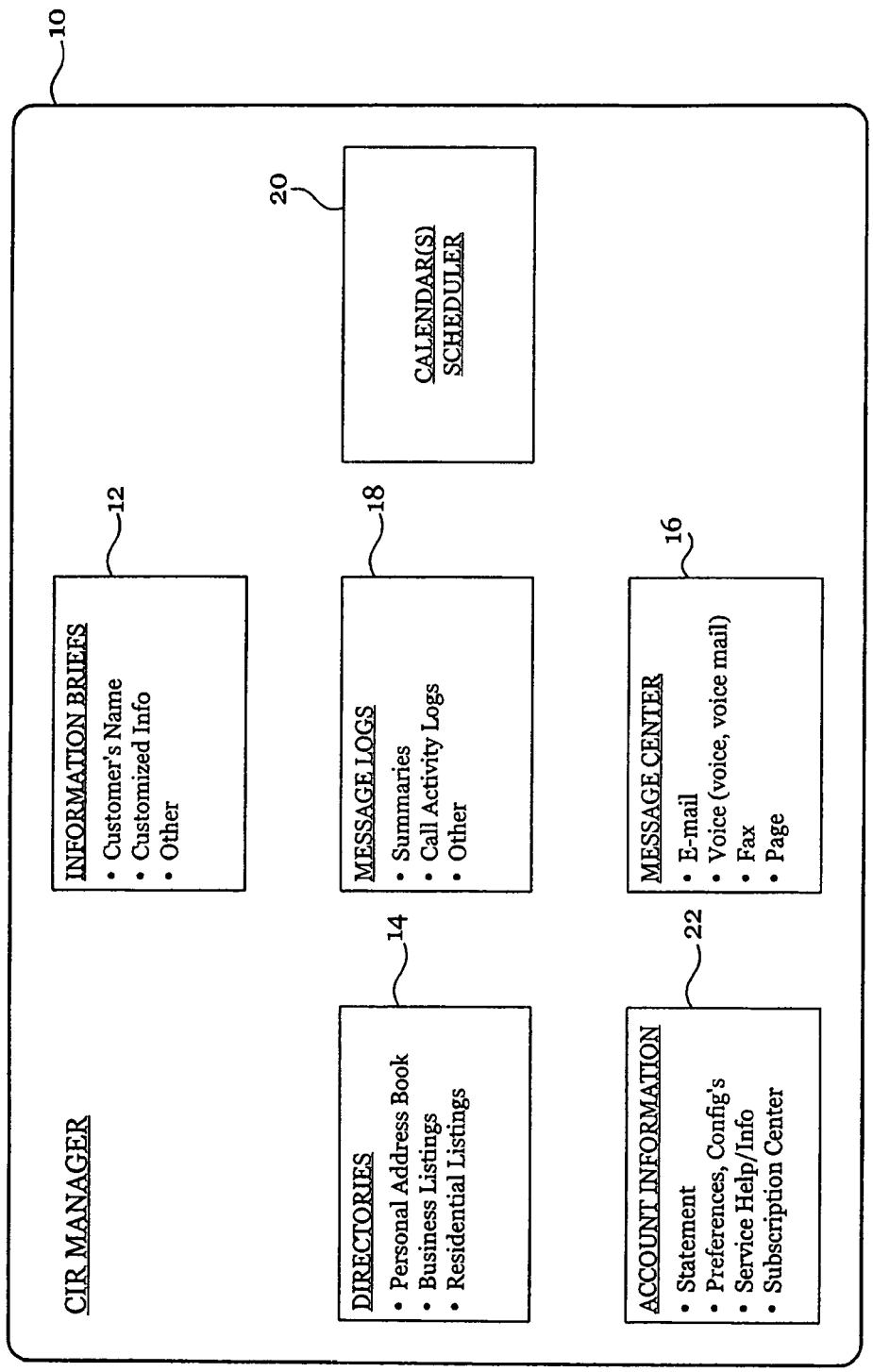
FIG. 1 is a block diagram illustrating exemplary functions of an exemplary CIR manager.

Exemplary Function of the Present Inventions—FIG. 1

An exemplary communications and information resource (CIR) manager 10 may include a variety of functions. Further, each CIR manager 10 may be different in functions, configuration, and in other ways from other CIR managers. Exemplary interactive functions that may be available to a user include, as illustrated in FIG. 1, the following:

Information Briefs 12

Directories 14

Message Center 16

Message Logs 18

Calendar/Scheduler 20

Account Information 22

The functions 12, 14, 16, 18, 20, and 22 are illustrated and described herein for convenience as if each were a discrete unit. But such discreteness is unnecessary. The organization of the functions into the discrete units, and the sub-functions of each such unit are only exemplary and provided for ease of explanation. In fact, the functions, sub-functions, and information related thereto may be organized in a different manner.

Information Briefs

The exemplary Information Briefs 12 function may include features that make the CIR manager 10 appear user-friendly. Information Briefs 12 may include information related to the user's identity such as the user's name, and/or other identifying information such as a password or personal identification number (PIN).

Information Briefs 12 also may include information relating to the user that has been selected by the user or otherwise constitutes information customized to the user. For example, customized information may include a quote-of-the-day, a joke, stock quotes, weather, news headlines, etc. With the identity information and the customized information, an exemplary CIR manager 10 "recognizes" a user when he or she activates or uses the CIR manager 10, and "greets" the user with information that has been customized for that user. The recognition of the user and the presentation of customized information advantageously makes the CIR manager 10 appear especially user-friendly.

Directories

The exemplary Directories 14 function of the CIR manager 10 relates to information resources useful to communications activities and available to the user. For example, the Directories 14 function may allow the user to create directories, address books, listings of information, and similar information resources. In addition, the Directories 14 function may be set up to access and to allow the user to access information resources that may have already been created by a user. For example, the Directories 14 function may allow a user to access one or more personal directories or address books, contact information, business or residential listings, etc. The Directories 14 function may include other or have access to other information resources as well. Further, the Directories 14 function may include features that allow the CIR manager 10 to appear to be making suggestions, asking questions, or offering guidance to the user in obtaining information or checking resources. In addition, the Directories 14 function may include features that obtain data or information for the user with or without the user's specific promptings therefor.

Message Center

The exemplary Message Center 16 function of the CIR manager 10 relates to communication actions available to the user. For example, the Message Center 16 may allow a user to view and access telephone call messages, electronic mail (e-mail), voice mail, fax messages, pages, and similar communications. As another example, the user may initiate almost any type of communication from the Message Center 16. Additional information about the Message Center function 16 is provided below in connection with the description of FIG. 5A.

Message Logs

The exemplary Message Logs 18 function of the CIR manager 10 relates to the organization, summary, and display of information pertaining to communications activities of a user. For example, the Message Logs 18 may include one or more summaries of new, reviewed, or sent communications. Also, the Message Logs 18 may include one or more call activity logs that keep track of calls or communications activity by the user. Advantageously, the Message Logs 18 function allows the user to keep track of all types of communications activity including conventional messages such as voice mails, e-mails, faxes, and pages. Plus, the Message Logs 18 function allows the user to keep track of other types of messages such as instant messages, conversations in a chat room, and attempts at contact made by others. Additional information about the Message Logs 18 function is provided below in connection with the descriptions associated with FIGS. 5A and 5B.

Calendar/Scheduler

The exemplary Calendar/Scheduler 20 function of the CIR manager 10 may include calendaring and scheduling actions. A user may keep one or more calendars (such as personal, business, etc.), and use the scheduler for data entry or other uses such as notification relating to the calendars or for other functions. The CIR manager 10 may allow a user to create a calendar or to implement a scheduler, or the CIR manager 10 may access such features already created or being used.

Account Information

The exemplary Account Information 22 function of the CIR manager 10 relates to information pertaining to the user's use of the CIR manager 10. For example, the user may access the Account Information 22 to review and take other actions with respect to services rendered relating to the CIR manager 10 as provided by a service provider. As a specific example, the user may access the Account Information 22 to view his or her statement of account. The user also may set up and/or configure the services of the CIR manager 10 to his or her personal preferences or needs using the Account Information 22 function. Further, the user may obtain help and/or information from the service provider through the Account Information 22 function.

In addition, the Account Information 22 function may allow a user to access a subscription center of the service provider and/or third parties. Through the subscription center, the user may review various types of products and services, and may obtain additional information, purchase, or obtain help regarding such products and services, etc. In an embodiment wherein the CIR manager 10 is implemented in a personal computer (PC) with access to the Internet (or other appropriate network), the subscription center may be referred to as an "e-store" or electronic store. A user may "shop" at the e-store for products and services by using the CIR manager as implemented on the user's PC.

Interoperability of the Functions of the CIR Manager

Advantageously, the functions of the CIR manager 10 may work together through the exchange of information or otherwise. For example, the Information Briefs function 12 includes identity information and customized information relating to the user. When a graphic user interface (GUI) of the CIR manager 10 is presented to the user, the GUI, whatever the function, may include the identity information and the customized information. Specifically, assume the user is presented with a GUI including a summary of communication activities through use of the Message Logs function 18. As part of the GUI displaying the summary, the user may be presented with the identity information such as ("Hello Dale Malik!") and/or the customized information ("It's raining in Dunwoody today.").

Similarly, the identity information from the Information Briefs function 12 may interact with the other functions of the CIR manager 10. For example, the identity information may be used by the Account Information function 22 in presenting the user with a statement for services, in setting-up the user's configurations and preferences for the CIR manager 10, in providing service help and information, and also in assisting at the subscription center.

Another example of the interactivity or interoperability of the functions of the CIR manager 10 relates to the use of the information that may be found in the Directories function 14. As noted, the Directories function 14 may include a personal address book of the user for storing information on friends and family. An entry for a friend in the personal address book may include the friend's name, nickname, address, telephone number, wireless number, pager number, fax number, e-mail address, birth date, mode of communications preference, etc. The information relating to the friend in the personal address book included in the Directories function 14 may be obtained by or exchanged with other functions of the CIR manager 10.

For example, assume the user desires to communicate with a friend, and in doing so, the user selects the Message Center function 16. The user may provide the nickname of the friend, and information related to the friend may be obtained by the Message Center function 16 from the personal address book of the Directories function 14. The information related to the friend may indicate the mode of communications preferred by the friend. Based on this preference, the Message Center function 16 may set up a communication template for the preferred mode of communication for use by the user.

More particularly, assume the friend prefers to communicate by e-mail. Thus, in response to provision of the friend's nickname to the Message Center function 16, information related to the friend is obtained from the personal address book of the Directories function 14. Based on the information, the Message Center function 16 notes the preferred mode of communication being e-mail. So, the Message Center function 16 sets up an e-mail template in a GUI for use by the user. Preferably, the Message Center function 16 also populates the appropriate fields of the e-mail template with information relating to the friend. Thus, the e-mail template appears to the user with the friend's full name, e-mail address, date, time, etc. The user simply provides subject matter and text of the message to the friend, and sends the e-mail message from the Message Center 16 function.

Another example of the use of the information in the personal address book included in the Directories function 14 relates to interaction with the Calendar/Scheduler function 20. Assume an entry for a friend in the personal address book includes the friend's birthday. When the entry is set-up with this information, the personal address book may interact with the Calendar/Scheduler function 20 so as to provide the birthday to that function. The Calendar/Scheduler function 20 may note the birthday in the appropriate place. When the user reviews his or her calendar, the user may note the friend's birthday on the calendar as input through interactivity with the Directories function 14. Advantageously, the user does not have to (but may) enter the friend's birthday on the calendar. The entry of the birthday in the personal address book also causes the birthday to appear on the user's calendar through the interaction of the Directories function 14 and the Calendar/Scheduler function 20. Alternatively, the user may disenable this and other interactivity between and among the functions. Other examples of interactivity between and among the functions are provided below in describing other features of the inventions.

Figure 2:
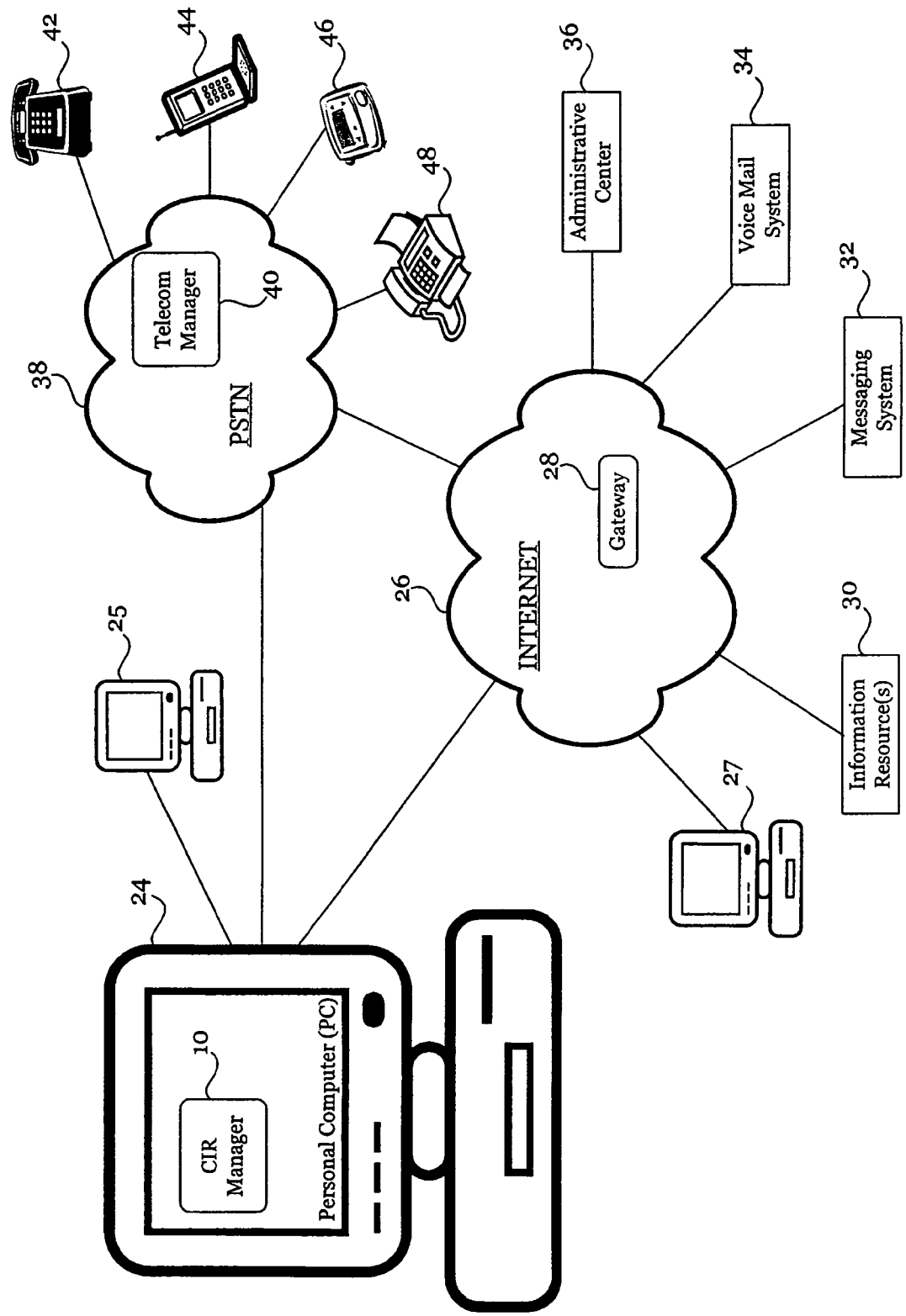
FIG. 2 is a block diagram of an operating environment of an exemplary CIR manager.

Exemplary Operating Environment of a CIR Manager—FIG. 2

Exemplary functions of a CIR manager 10 are described above in connection with FIG. 1. To provide these functions and others, the CIR manager 10 may interact with a variety of systems, networks, and elements that may be directly connected to the CIR manager 10, may be hosted by the same host(s) as the CIR manager 10, may be functionally connected to the CIR manager 10, and/or may be accessible to the CIR manager 10 either directly and/or through other systems, networks, and/or elements.

FIG. 2 illustrates an exemplary operating environment of a CIR manager 10 implemented on a personal computer (PC) 24. (For details of an exemplary PC 24 as may be used with the CIR manager 10, see the description below made in connection with FIG. 3.) The inventions described herein including the CIR manager 10 may also be practiced with other computer system configurations, including hand-held devices, multiprocessor systems, microprocessor based or programmable consumer electronics, mini-computers, mainframe computers, etc.

The operating environment of FIG. 1 illustrates the CIR manager 10 may communicate through the PC 24 with another computer(s) 25 connected or otherwise networked with the PC 24. The CIR manager 10 also may communicate through the Internet 26 with the following:

Other computer(s) 27;
A gateway 28 serving the CIR manager 10;
An information resource 30 such as a database;
A messaging system 32;
A voice mail system 34;
An administrative center 36; and
The public switched telephone network (PSTN) 38.

In addition, the CIR manager 10' may communicate through the PSTN 38 with the following:

A telecommunications manager 40;
A telephone (wireline unit) 42;
A wireless unit 44;
A pager 46; and
A fax device (not illustrated).

The exemplary operating environment is now more particularly explained. The CIR manager 10 may have access to other computers 25 through local area networks (LANs), wide area networks (WANs), direct connections and other dial-up networks.

The CIR manager 10 also may have access through the PC 24 to a global communications network such as the Internet 26, and through the Internet 26 to other units, networks, and systems. Particularly, the CIR manager 10 may communicate with a gateway 28 connected to or operating on the Internet. The gateway 28 may be a service platform, or other device. The gateway 28 may be provided by the service provider of the CIR manager 10, and may serve the CIR manager 10. Communications activities to and from the CIR manager 10 on the PC 24 may be directed to the gateway 28 and/or may pass through the gateway 28 to other systems, networks, and/or elements. In passing through the gateway 28, the communications activities may be facilitated by the gateway 28.

For example, assume a user is a new subscriber to the CIR manager 10. In setting up the user for services available through the CIR manager 10, the CIR manager 10 may send a communication to the gateway 28 for routing to the appropriate element to handle such set-up activities. In an exemplary embodiment, Administrative Center 36 may handle administrative matters including set-up activities for the service provider. The gateway 28 delivers or otherwise routes the communication to the Administrative Center 36 for the set-up activity. The Administrative Center 36 may respond to the gateway 28 with questions, information, and instructions for the CIR manager 10.

Another way in which the gateway 28 may facilitate communications activities of the CIR manager 10 is to function as a router or director of communications and messages. For example, the CIR manager 10 may forward a request for data to the gateway 28. The gateway 28 may determine the data may be obtained from the information resource 30. The gateway 28 then forwards the request for data or the appropriate message to the information resource 30. The information resource 30 may respond to the CIR manager 10 or to the gateway 28, which then communicates with the CIR manager 10.

The gateway 28 may interact with a messaging system 32, a voice mail system 34, and other systems. The interaction of the gateway 28 with such systems stems from the general function of the CIR manager 10 as a "super-manager" of communications rather than a provider of specific communication services. Thus, the CIR manager 10 through the gateway 28 may interact with the messaging system 32, the voice mail system 34, and other systems to centralize and efficiently organize the communications of the user. Nonetheless, in some embodiments, the CIR manager 10 may include or have systems such as a messaging system, voice mail system, or the like available for use by or to serve the user.

Generally, the messaging system 32 may be a comprehensive messaging system including messaging functions and features. The messaging system 32 may include data storage for messages and command logic for manipulation of the stored data via retrieval and indexing of messages and other information. Also generally, the voice mail system 34 may be a comprehensive voice mail system including voice mail messaging and functions. The voice mail system may be an enterprise or public network-based voice mail system.

Further, the gateway 28 may facilitate communications activities between the CIR manager 10 and the PSTN 38, and other elements reached through the PSTN 38 such as the telecom manager 40, and the communications devices including the wireline unit 42, the wireless unit 44, the pager 46, and the fax device 48. Generally, the telecom manager 40 provides general functions and features related to communications of a user. Specifically, the telecom manager 40 may be implemented in a computer, on a service platform, in a network node, or other device. The telecom manager 40 may include connections to devices and networks through integrated services digital network (ISDN) lines and signaling system 7 (SS7) data links. The telecom manager 40 may be capable of functions similar to those of a service switching point (SSP) or service node (SN) of an Advanced Intelligent Network (AIN). For example, the telecom manager 40 may have the following capabilities: signaling, call set-up, routing, and access to databases.

Figure 3:
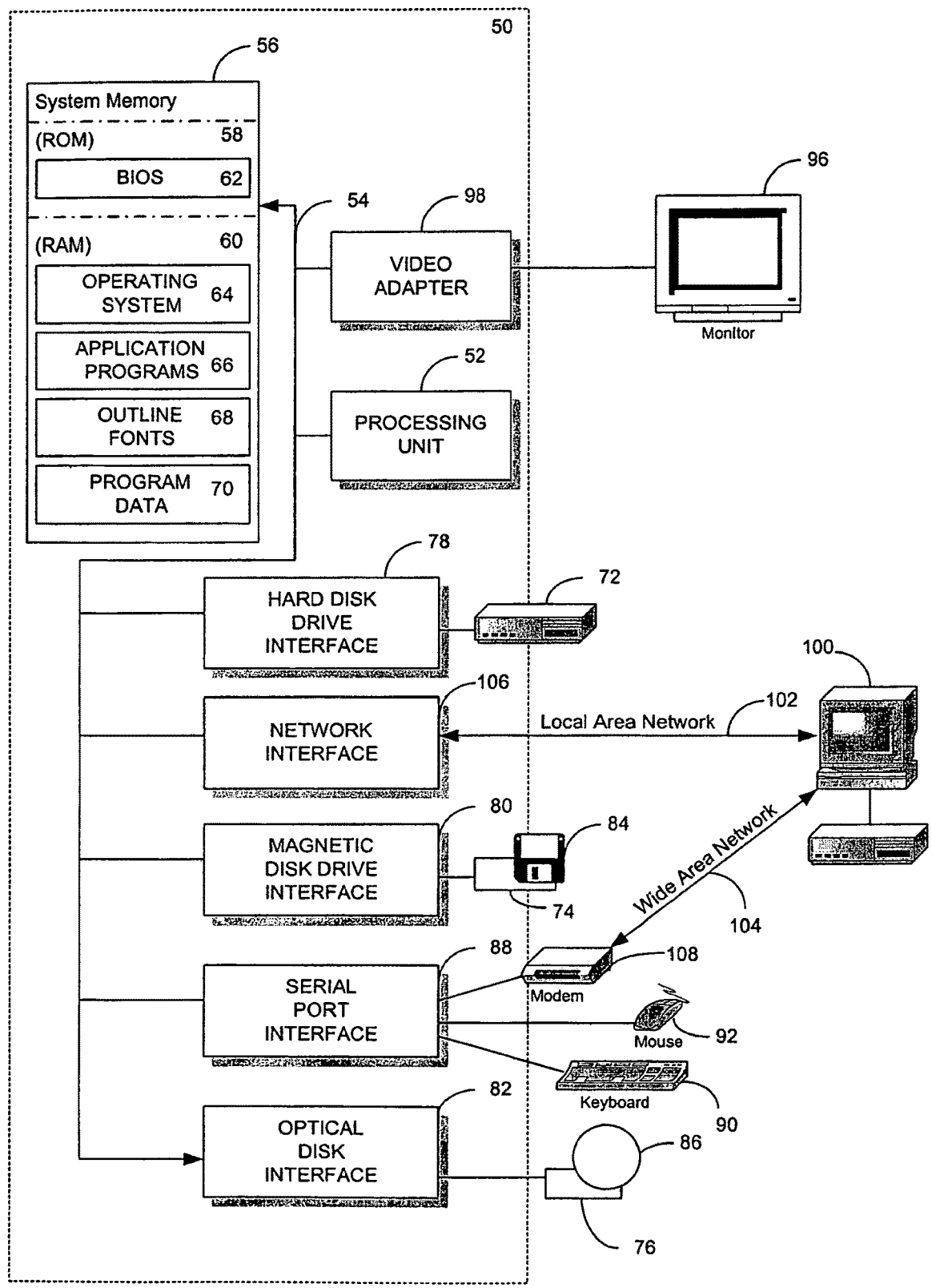
FIG. 3 is a block diagram of a computing environment such as may be used with exemplary embodiments of the CIR manager.

Exemplary Computing Environment—FIG. 3

FIG. 3 illustrates an exemplary environment 50 for implementing the inventions in or through use of a personal computer (PC). For example, the inventions may be implemented through an application program running on an operating system of a PC. The inventions also may be practiced with other computer system configurations, including hand-held devices, multiprocessor systems, microprocessor based or programmable consumer electronics, mini-computers, mainframe computers, etc.

The application program may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

FIG. 3 illustrates a PC 50 including a processor (also referred to as a processing means or processing unit) 52 joined by a system bus 54 to a memory (also referred to as system memory) 56. The memory 56 may include read only memory (ROM) 58 and random access memory (RAM) 60. The ROM 58 stores the basic input/output system (BIOS) 62, which contains basic routines that aid in transferring information between elements within the PC 50 during start-up, and at other times. The RAM 60 may store program modules and drives. In particular, the RAM 60 may include an operating system 64, one or more application programs 66, outline fonts 68, program data 70, a web browser program (not illustrated), etc.

The PC 50 also may include a plurality of drives interconnected to other elements of the PC 50 through the system bus 54 (or otherwise). Exemplary drives include a hard disk drive 72, a magnetic disk drive 74, and an optical disk drive 76. Specifically, each disk drive may be connected to the system bus 54 through an appropriate interface (respectively, a hard disk drive interface 78, a magnetic disk drive interface 80, and an optical drive interface 82). Further, the PC 50 may include non-volatile storage or memory through the drives and their associated computer-readable media. For example, the magnetic disk drive 74 allows for the use of a magnetic disk 84; and the optical disk drive 76 allows for the use of an optical disk 86. Other types of media that are readable by a computer, e.g., magnetic cassettes, digital video disks, flash memory cards, ZIP cartridges, JAZZ cartridges, etc., also may be used in the exemplary operating environment.

In addition, the PC 50 may include a serial port interface 88 connected to the system bus 54. The serial port interface 88 connects to input devices that allow commands and information to be entered. These input devices may include a keyboard 90, a mouse 92, and/or other input device. Pens, touch-operated devices, microphones, joysticks, game pads, satellite dishes, scanners, etc. also may be used to enter commands and/or information. The input devices also may be connected by other interfaces, such as a game port or a universal serial bus (USB). Further, the PC 50 may include a monitor or other display screen 96. The monitor 96 is connected through an interface such as a video adaptor 98 to the system bus 54. The PC 50 may include other peripheral and/or output devices, such as speakers or printers (not illustrated).

The PC 50 may be connected to one or more remote computers 100, and may operate in a network environment. The remote computer 100 may be a PC, a server, a router, a peer device or other common network node, and may include many or all of the elements described in relation to the PC 50. The connection between the PC 50 and the remote computer 100 may be through a local area network (LAN) 102 and/or a wide area network (WAN) 104. The PC 50 is connected to the LAN 102 through a network interface 106. With respect to the WAN 104, the PC 50 may include a modem 108 or other device to channel communications over the WAN 104, or global data communications network (e.g., the Internet). The modem 108 (internal or external) is connected to the system bus 54 via the serial port interface 88. The network connections illustrated in FIG. 3 are exemplary and other ways of establishing a communications link between the PC 50 and a remote computer 100 may be used.

Setting Up the CIR Manager 10 for a User

A user may become aware of the benefits of the CIR manager 10 in any numbers of ways, and contact a service provider for the CIR manager 10 and/or services provided in connection with the CIR manager 10. Thus, the user also may be referred to as a subscriber, a customer, or a client. To set up the CIR manager 10, the user is provided with the appropriate application program(s) or whatever other mechanism or device may be necessary to implement the CIR manager 10 and/or the services of the CIR manager 10. Generally, once a user decides to subscribe to or otherwise use the CIR manager 10, the service provider obtains information and preferences from the user, sets up the CIR manager 10 per the user's information and preferences, and otherwise configures the CIR manager 10 to operate with the user's selected devices and services.

The user may customize the CIR manager 10 to his or her personal preferences. This customization may include identification information related to the user such as name, password, personal identification number (PIN), address, telephone number, fax number, e-mail address, pager number, wireless unit number, etc. This customization also may include the inclusion of identification information of others who are authorized to make use of the CIR manager 10. In addition, this customization may include the inclusion of people and entities with whom the user communicates. Further, the customization may include other information such as preferences for modes of communications, for times of communications, for data such as a quote-of-the-day, weather, news headlines, etc. The information relating to the user may be stored on the user's PC or otherwise accessible to the applications program or other devices implementing the CIR manager 10. In addition, the information may be stored at and accessible to and from another element. For example, the information may be stored at the gateway 28 in the Internet 26, the telecom manager 40 in the PSTN 38, the administrative center 36 (all referenced in connection with FIG. 2), or elsewhere. When information related to a user is stored at an element remote from the PC 24 of the user, then the CIR manager 10 may communicate with the remote element for the information. For example, the CIR manager 10 may communicate with or through the gateway 28 in the Internet 26, the telecom manager 40 in the PSTN 38, the messaging system 32, or the voice mail system 34.

Advantageously, in an embodiment, the CIR manager 10 may function to add, change, delete, or update information related to a user including identification information. For example, a user may have his or her account for the CIR manager 10 set up prior to obtaining a wireless unit such as a mobile phone. So, the identification information relating to the user at set-up does not include a mobile phone number. Once the user acquires a mobile phone, information relating to the user's mobile phone may be stored at or made accessible to the CIR manager 10. For example, the CIR manager 10 may have access to a database, a listserv, or other resource with information on new wireless users. The CIR manager 10 may note the presence of the user's name or other identifying information from the resource, and may obtain the pertinent data related to the user's use of wireless services. The CIR manager 10 then may update its records on the user.

As another example, some time after set-up, the service provider of the CIR manager 10 may begin to provide wireless service to the user. Thus, the CIR manager 10 may have access to the service provider's records so as to update the identification information related to the user with the user's new mobile phone number. As yet another example, the user may receive an e-mail from a friend. But the CIR manager 10 may not include information relating to the friend in the user's identification information. The CIR manager 10 may use the information from the e-mail to create an entry or record of identification information relating to the friend for the user.

In addition, the CIR manager 10 may have access to a variety of resources (such as databases or listservs on the Internet or other networks) that may include data about, related to, or of interest to the user. The CIR manager 10 may monitor these resources, and as information about the user is added, changed, or deleted, the CIR manager 10 may update its own records on the user. If the monitoring and retrieval of the data about the user involves a charge, then the CIR manager 10 may communicate with the user as to whether to proceed with the monitoring and retrieval, how to pay for the charge, etc.

Figure 4:
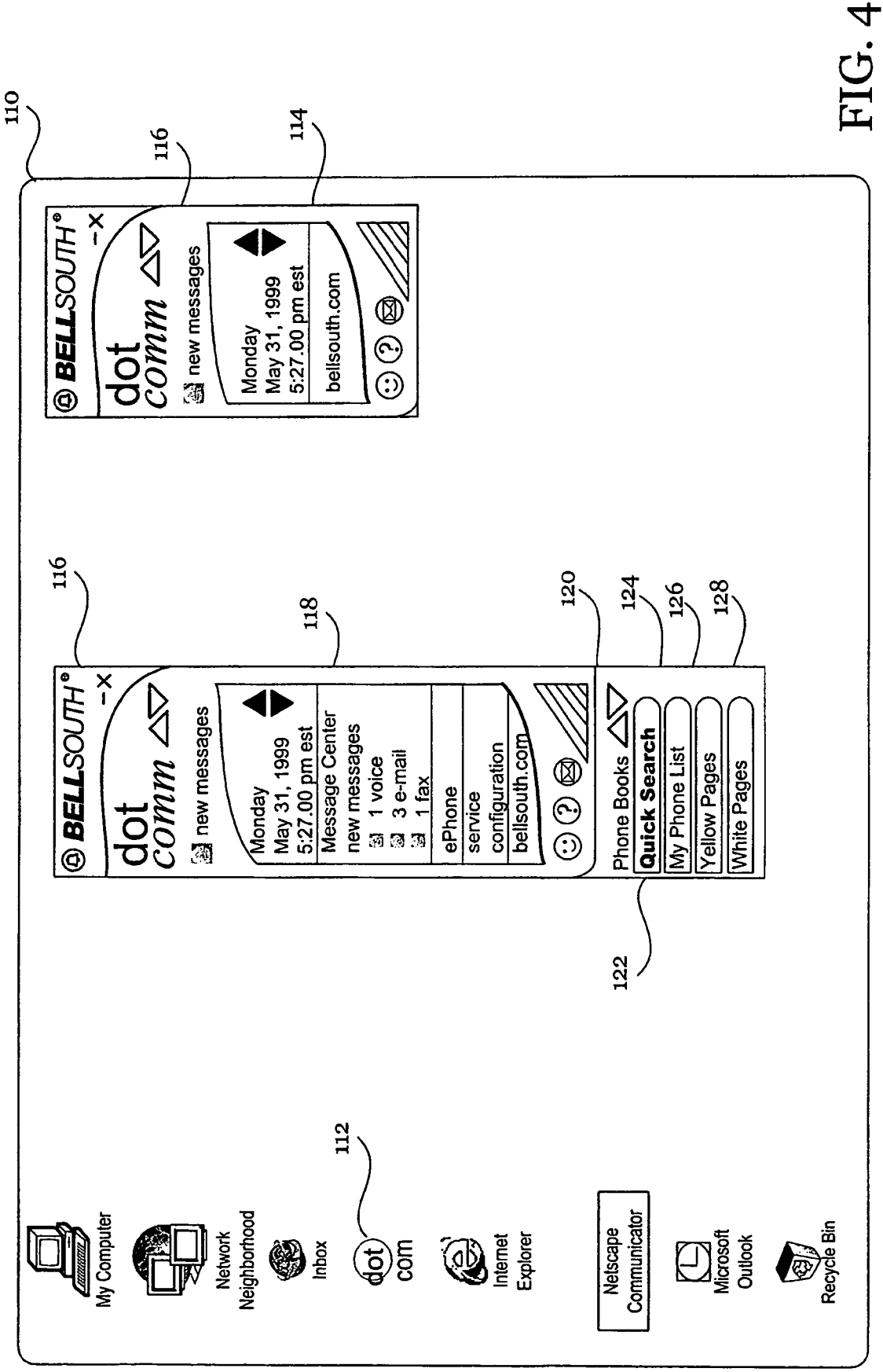
FIG. 4 illustrates an exemplary screen of a computer displaying icons related to exemplary CIR managers.

An Exemplary Desktop Presence of the CIR Manager—FIGS. 4-5

The CIR manager 10 may be implemented in a user's personal computer (PC) or other device. For convenience, the CIR manager 10 may be implemented through a computer program or application program that operates as a persistent desktop presence. The CIR manager 10 may include a program icon displayed on the desktop or screen layout of the computer's operating environment. FIG. 4 illustrates an exemplary desktop 110 of a user's computer. In this example, eight program icons are displayed along the left side of the desktop 110. The fourth program icon from the top, the dotcomm icon 112, is an exemplary program icon such as may be used with a computer program version of the exemplary CIR manager of the present inventions. Alternatively, the program icon for the exemplary CIR manager 10 may appear in a different form or contain additional or different information.

An alternative or additional dotcomm icon 114 for the CIR manager 10 also is illustrated in FIG. 4, but in the upper right corner of the desktop 110. The alternative dotcomm icon 114 is an expanded icon including information that may be useful to the user. For example, the expanded icon 114 may include the day-of-the-week, date, and time, and buttons or labeled inputs corresponding to actions or information available to the user. As another example, one of the actions available to the user using this alternative dotcomm icon 114 is to review new messages as indicated by the button labeled "new messages" 116. In alternative embodiments, each of the dotcomm icons may include a graphic image or other indicator to notify the user of a new (unread) communication received for the user.

As yet another alternative in dotcomm program icons, still referring to FIG. 4, the use of the smaller dotcomm icon 112 may be coordinated with the larger expanded dotcomm icon 114. For instance, the desktop 110 may only display the dotcomm icon 112. But clicking-on the dotcomm icon 112 may result in display of the different or expanded dotcomm icon 114 prior to the display of any further information.

Clicking-on a dotcomm icon 112 or 114 provides the user with access to the features and functions of the CIR manager 10, which also may be referred to herein as the dotcomm appliance or program. Thus, clicking-on the dotcomm icon may be said to "activate" the CIR manager 10 even though the CIR manager 10 is already active in the sense that the CIR manager 10 is a continual desktop presence and continuously carries out its features and functions even though the user may not have the graphic user interfaces (GUIs) of the CIR manager opened, displayed, and/or in use on the desktop 110.

FIG. 4 further illustrates a possible result of activating the exemplary CIR manager 10. The first action in the activation of the CIR manager 10 may be the display of another version of the dotcomm icon 116 such as illustrated in the center of the desktop 110 of FIG. 4. The dotcomm icon 116 is an expanded version of the dotcomm icon 114. The dotcomm icon 116 includes the information contained in the dotcomm icon 114 as well as additional information including buttons (also referred to as labeled inputs) corresponding to actions and information available to the user.

Particularly, the dotcomm icon 116 includes additional information in a display including a heading of "Message Center" 118 and including a tally of new messages for the user. In summary form, the dotcomm icon 116 displays by type the number of new voice, e-mail, and fax messages received for the user. Advantageously, the user may specify that the number of other, additional, or fewer types of messages be displayed. Thus, the CIR manager 10 may function as a means of unified messaging and notification to the user with respect to communications of various types and formats that may be directed to the user.

In addition, the dotcomm icon 116 provides the user with quick access to services or information available through the CIR manager 10. These services and information may include access to an electronic telephone (e-phone), information on service configurations, and an address for the web site of a service provider such as Bellsouth.net. Further, the dotcomm icon 116 provides the user with quick access to information available through the CIR manager 10 such as may be found in an address book or telephone directory. This quick access is provided through buttons or other labeled inputs within an area of the dotcomm icon 116 bearing the heading "Phone Books" 120. Thus, the dotcomm icon 116 includes a button labeled "Quick Search" 122 for access to a search feature of the CIR manager 10, a button labeled "My Phone List" 124 for access to the user's personalized list in the CIR manager 10, and a button labeled "Yellow Pages" 126 and a button labeled "White Pages" 128 for access to the information through the CIR manager 10 contained in the respective telephone directories. Advantageously, the user may specify that other, additional, or fewer buttons for quick access to other, additional, or fewer services or information be included in the dotcomm icon 116. Thus, the CIR manager 10 provides the user with a personalized way of accessing information resources such as directories including personal directories.

As explained above, in some embodiments, the dotcomm icon 116 may be displayed after clicking-on one or both of the previously described dotcomm icons 112, 114. In other embodiments, the dotcomm icon 116 may be the only program icon displayed.

In sum, clicking-on a dotcomm icon 112, 114, 116, or otherwise providing input to activate the CIR manager 10 results in the features, functions, and resources of the CIR manager 10 being made available to the user. The user may access the features, functions, and resources of the CIR manager 10 in any order. The order presented herein is generally only exemplary.

Welcome Display

The CIR manager 10 may be configured to present the user with an initial, personalized "welcome display". The welcome display may include the user's name and other information including information customized for the user. For example, the welcome display may include a cartoon of the day, an inspirational message, or a specific graphic image selected by the user. The welcome display serves to alert the user that he or she is recognized by the CIR manager 10 and that his or her preferences are being implemented. The welcome display generally serves to make the CIR manager 10 and its use more personalized to the user and user-friendly. In some embodiments, the welcome display may be referred to as "Info Briefs", or "Main Page".

Advantageously, the user may configure the welcome display to include buttons or other labeled inputs to information resources that may be frequented by the user or may be particularly useful to the user. For example, the welcome display may include a button labeled "browser" or other indicator so as to allow the user quick access through the CIR manager 10 to the Internet and browsing functions by activation of the button. As another example, the welcome display may conveniently include a button labeled "service provider" so as to allow the user quick access to the home page on the Internet or other connection to the service provider of the CIR manager 10. This service provider button may be especially useful when the user has any questions or problems related to the CIR manager 10. Another convenient button that may be added to the welcome display is a "my profile" button so as to allow the user to access, review, add, change, and delete preferences relating to the user's use of the CIR manager 10. In addition, a button labeled "my account" may be included on the welcome display so as to allow the user to access information relating to the user's account with the service provider (or other entities) as related to the CIR manager 10 or otherwise.

Exemplary Communication Functions and Information Resources

The exemplary CIR manager 10 provides the user with unified messaging and notification. The CIR manager 10 allows the user to receive, review, and send communications in any of a variety of formats and using a variety of media. As examples, a user may receive, review, or send an e-mail message, a telephone call (from/to a wireless or wireline device), a page, a facsimile, or a voice mail message through the CIR manager 10. In connection with the messaging and notification, the CIR manager 10 may search for and retrieve related information, and provide the user with an opportunity to view and/or take action on the related information.

For example, assume a user receives an e-mail from a potential customer. When the user begins to draft a reply to the e-mail, the CIR manager 10 may provide the user with an opportunity to review all messages or communications relating to the customer. The other messages relating to the customer may aid the user in crafting the reply to the customer's e-mail. Advantageously, the user is presented with the option of reviewing all such messages without the user having to take the time and make the effort to find, retrieve, and review such messages. In sum, the CIR manager 10 generally may cause its functions to interact so as to bring all the appropriate information to a user's attention without the user having to search for such information on a piecemeal basis.

The CIR manager 10 also allows the user to access personalized information resources such as a personalized calendar, personal directories, account information, etc. Further, the CIR manager 10 provides the user with mechanisms to quickly and efficiently access information resources. Advantageously, the CIR manager 10 uses the data provided by the user or from communications related to the user to complete records related to the user, to anticipate actions by the user so as to respond to those actions quickly, to present the user with choices in features, functions, information resources, and services, and to obtain and make available information resources with and without specific input by the user. The CIR manager 10 as a "super-manager" may cause its functions to interact with each other and with accessible elements and systems so as to efficiently provide the user with as much relevant information as possible and so as to save the user from having to make separate inquiries and take multiple actions.

Advantageously, the CIR manager 10 may allow the user to work on the computer in a "do not disturb" (DND) mode with respect to communications. The user may configure the DND mode to his or her preferences. For example, the user may configure the DND mode so that no communications and/or information are provided while the DND is activated. Alternatively, the DND mode may be configured so the user is presented only with a specific kind of message or with notice of receipt of the specific kind of message. For example, the user may choose to be notified in DND mode of the receipt of instant messages, emergency telephone calls, high priority e-mails, and/or the like. As another example, the DND mode may be configured so the user is presented only with messages (whatever the type) from a specific person, entity, address, telephone number, and/or the like. Thus, the user may operate in DND mode, but be assured all messages (whatever the type) received from the user's most important customer are immediately delivered or notice thereof provided to the user.

Another function of the CIR manager 10 is a response capability to messages received for a user. The response capability may be implemented to automatically send a response, or to automatically query the user whether to send a response. The response capability also may be implemented on a message by message basis at the direction of the user.

A response to a message received for the user may be a standard response or a selected response. A standard response may be a general acknowledgement of the received message, typically without information customized for the sender. A user may set up a general form (or default) response to be provided to a message sender. The user may select the type of response to be used as the general form or default response. For example, the user may choose to have all responses take the form of an e-mail (or other type of communication), or the user may choose to have the response match the type of the received message. Thus, a fax to the user may be responded to with a response fax. As another example, the user may choose to have all responses to communications received during business hours take the form of e-mail, while responses to communications received at other times take the form of a fax. Generally, one of the purposes of a standard response is to be provided to the message sender without further interaction by the user.

In contrast to a standard response, a selected response may be a message that is customized for the sender in some way. A selected response generally requires input from the user such as selection of specific text, specific mode of the response, specific time for delivery of the response, etc.

A selected response may be completely composed by a user, or a selected response may include "canned" information selected generally by the user from a list or options of canned information. For example, a list of canned information may include the following options for the substance of the response:

Will contact—"Thank you for your message. I will contact you at my earliest opportunity."
Out of office—"I am out of the office, and will contact you when I return."
Contact assistant—"Please contact my assistant."
Remove me—"Please remove me from your message list."
Customized—A user may compose some text for inclusion in a response message.
Call me back—"Please call me at the following number: NXX-XXXX".

To illustrate use of a selected response, assume a user receives an e-mail or a telephone call from a telemarketer. In response, the user may choose to send a selected response by e-mail, and from the list of options of canned information, the user may select text to be included in the e-mail. With respect to a telemarketer, the user may select the "Remove me" response. As with the standard response, the user may choose to have all selected responses take the form of an e-mail (or other type of communication), or the user may choose to have the response match the type of the received message, or other forms.

To illustrate another use of a selected response, assume a user is working in do not disturb (DND) mode so calls to the user's telephone number are directed to voice mail. Information about each of the calls may be provided to the user as entry information in a message log or table presented to the user in the message center accessible to the user through his or her computer. In viewing the information in the table, the user may note the receipt of a call from a special customer. The user may select the entry relating to the call from the special customer, and elect to send a selected response to the special customer. The special response may be any type of message, may include the "Call me back" response, and may include an alternative telephone number for use by the special customer in contacting the user. Another example of the use of selected responses is discussed below in connection with FIG. 10.

Advantageously, the CIR manager 10 may be set to keep track of the received messages such as received from the telemarketer and the user's response in the above examples. The CIR manager 10 may keep track of the exchange of messages in a log in the message center 130 or otherwise.

Other examples of messaging functions are provided below after a description of some of the organizational features and call management details of the CIR manager 10 such as the message center.

Figure 5A:
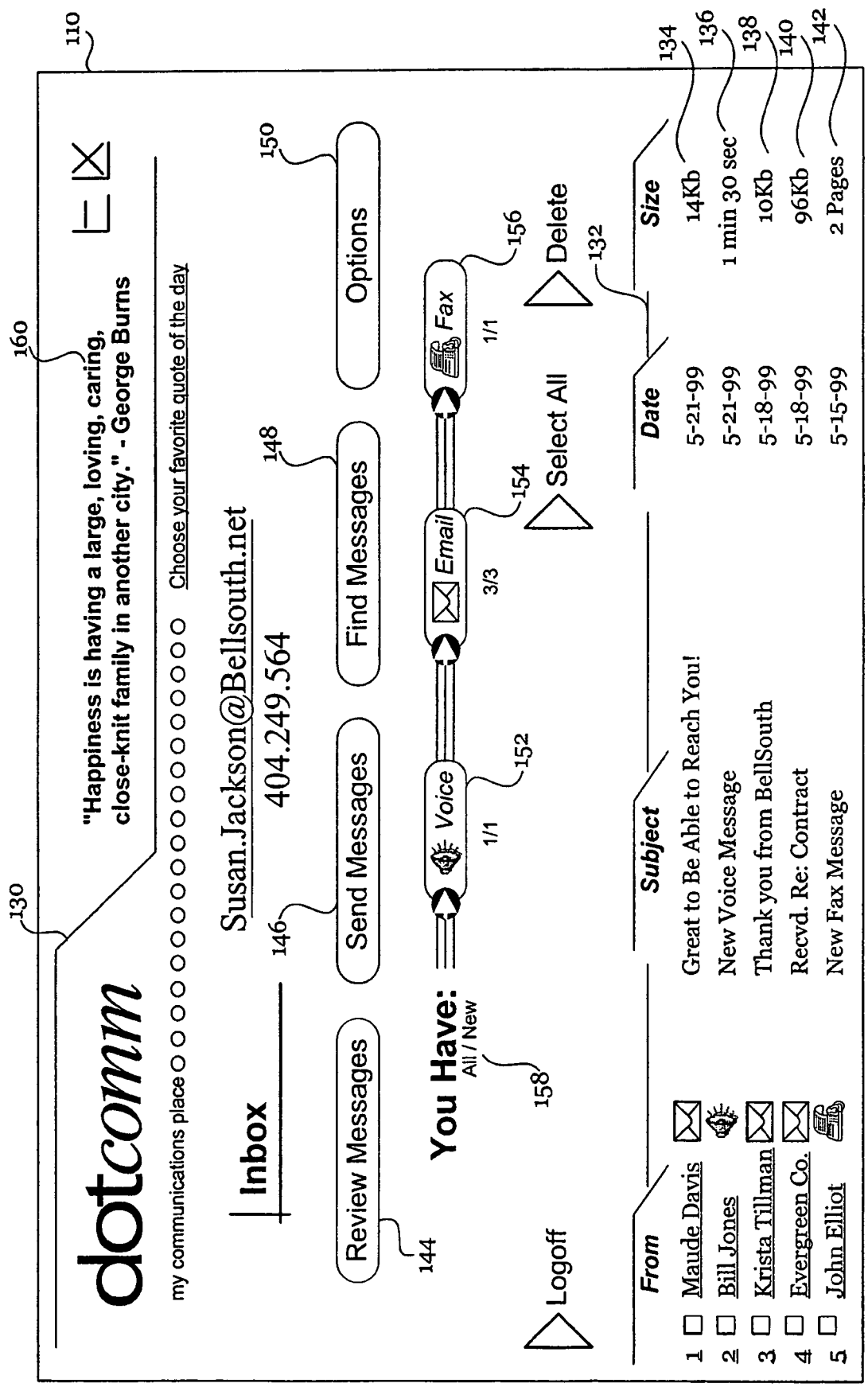
FIG. 5A illustrates an exemplary screen of a computer displaying an exemplary message center of an exemplary CIR manager.

Exemplary Message Center—FIG. 5A

The exemplary CIR manager 10 provides the user with call management and information relating to communications. Among the features of the exemplary CIR manager 10 is a message center 130 that may be displayed on the user's computer screen 110. The message center 130 may be used for a variety of things including: for viewing message information on messages; keeping track of communications; for accessing communications functions; for providing the user with summary information relating to communications; and for providing a display relating to communications configured according to the user's preferences. The message center 130 may implement Message Center functions 16, Message Log functions 18, (see FIG. 1) as well as other functions.

A user may access the message center 130 of the CIR manager 10 by clicking on an appropriate button or other input on the dotcomm icon 112, 114, 116 or otherwise. As a result of the activation of the message center 130 by the user, the CIR manager 10 may use data relating to the user (user data) to obtain information on the user's messages and communications, and to display (through the message center 130 described below or otherwise) the information in an organized fashion pursuant to the user's preferences on a display screen 110 of the computer.

To connect to and/or interface with the various communications elements or systems, the CIR manager 10 may include and/or may have access to user data, which also may be referred to as identification information. The data of a particular user may include details related to one or more of the communications services, elements, networks, or systems serving, accessible to, or otherwise associated with the particular user. The user data may be created for use in connection with the CIR manager 10. The user data also may be data collected or compiled by other communication features and functions, and made available, provided, copied to or obtained by the CIR manager 10. The user data may include details that allow the CIR manager 10 to interface with services, elements, devices, networks, or systems serving, accessible to, associated with, or having information on or related to the particular user. For example, the user data may include details related to the configurations of the various services or systems available to the user. Further, the user data may include details related to the personal preferences or identity of the user such as a personal identification number (PIN) or the like.

The user data may be stored or included in the CIR manager 10, in the user's PC, or may be included in another element, system, service, or network functionally that may be accessible to the CIR manager 10. For example, the user data may be stored by a telecommunications manager implemented as a service platform or in an element in the PSTN or other network. As another example, the user data may be stored in a computer accessible to the CIR manager 10, or in an element in a network accessible to the CIR manager 10 such as in an element in a telecommunications network, a data communications and/or other network, or in an element functionally connected to the telecommunications network, data communications network, and/or other network.

Exemplary Message Center 130—Keeping Track of Communications

Generally, the message center 130 keeps track of communications relating to the user by providing the user with a display of data. This data may include a message log or table 132 including entries of message information. The message log or table 132 is generally accessible to the user whether or not the user is operating in a "do not disturb" (DND) mode.

The message center 130 illustrated in FIG. 5A depicts an exemplary table 132 with five entries 134, 136, 138, 140, 142. The CIR manager 10 keeps track of communications directed to the user and/or sent by the user, and provides the message center 130 with the appropriate data. In some embodiments, the CIR manager 10 also may keep track of attempts to communicate with the user such as attempts by callers to reach the user. In some embodiments, the CIR manager 10 may keep track of instant messages, communications exchanges such as conversations carried out in chat rooms, and similar messages. For example, a user may set the CIR manager 10 to a "do not disturb" mode so information on communications is temporarily withheld from the user. But the data on the communications may be accumulated and kept track of in the message center 130. Even if the user is working in the "do not disturb" mode, the user may access the message center and view a message log or table 132 to see what communications have been received, who or what has been making communication attempts, what conversations have taken place in a chat room, etc.

For each communication, the message center 130 may create an entry of message information. The entry may include limited data regarding the communication such as a source of the communication ("from"), destination of the communication ("to), copied parties ("cc"), blind copied parties ("bcc"), subject, date, time, size, and status of the communication (whether it has been read, its priority, its level of confidentiality, etc.), and whether the message or communication includes any attachments or other connections. Generally, the entry does not include the substance of the message or communication, but only limited data relating to the communication. The entries may be stored in the table 132 in the message center 130 according to the user's preference. For example, the user may choose to sort the entries in the table 132 by read versus unread messages, and/or by time, size, status, etc. of the message or communication. Referring to FIG. 5A, the exemplary message center 130 includes five entries 134, 136, 138, 140, 142 with the following data about each communication contained in the entry: "from"; "subject"; "date" and "size".

A user may take any of a variety of actions with respect to a communication by using or activating the entry of message information in the table 132 of the message center 130 that corresponds to the communication. By clicking-on an entry of message information, the user may access the communication. For example, by clicking on the entry in the table regarding an e-mail message, the user is presented with the text or substance of the e-mail message. If the e-mail message includes an attachment, the attachment may be accessed by the user through cooperation of the CIR manager 10 with the appropriate programs or function of the computer running the CIR manager 10. (Additional information regarding access to the substance of the communications is provided below in connection with a discussion of FIG. 7.) With respect to communications having entries of message information in the table 132 of the message center 130, the user may take at least the following actions: delete; forward, reply, reply all, copy, blind copy, file, store, send, etc.

As explained, the message center 130 may include all entries of message information in a single table (or log) 132 that may be presented to the user in a screen display. Advantageously, the message center 130 may be configured to the preferences of the user so that separate message tables, logs, or sub-logs may be created by type of message or by some other distinguishing feature of a message. For example, a table or sub-log may be created for messages sent by the user, another table may be created for messages received by the user, and/or yet another table may be created for messages filed by the user. Further, within each table, log, or sub-log, the entries may be organized based on one or more preferences of the user such as chronological organization, or organization by size, status, source, etc.

Figure 5B:
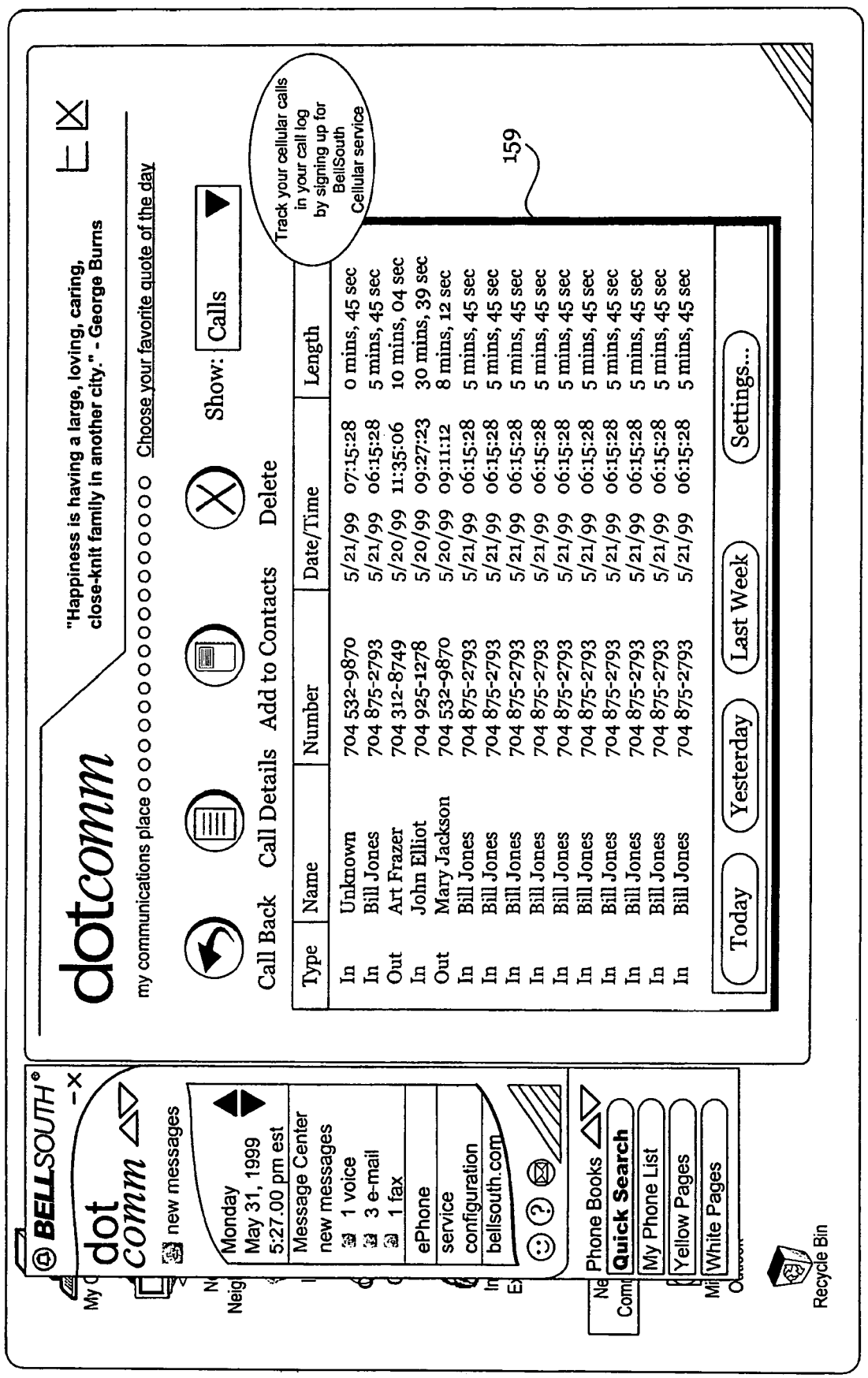
FIG. 5B illustrates an exemplary screen of a computer displaying an exemplary table of wireless calls.

Another example of a specialized table or log that may be created through use of the CIR manager 10 is a table of wireless calls. FIG. 5B illustrates such a table 159 including entries of message information relating only to wireless calls of the user. In this example, each entry of message information includes an indication of the type of call (whether "in" to the user or "out" from the user), name, number, date/time, and length. Advantageously, the user may use this table of wireless calls 159 as an aid in obtaining reimbursement for business calls, and in other ways.

Exemplary Message Center 130—Accessing Communication Functions

FIG. 5A illustrates the display screen of the message center 130 as being called the "Inbox" in this example. The Inbox includes buttons labeled for summary information including actions available to the user related to exemplary messaging functions such as "Review Messages" 144, "Send Messages" 146, "Find Messages" 148, and "Other Options" 150. Of course, other communication activities and messaging functions may be added to the message center 130 as per the user's preference. Thus, the message center 130 may function as more than a table or log of information in that a user may review, create, find, or send messages from the message center 130 as well as undertake other communication functions.

More particularly explained, the message center 130 provides the user with a display of and access to the communications function of the CIR manager 10. The message center may include buttons or other labeled inputs for the variety of communication actions such as the referenced "Review Messages" 144, "Send Messages" 146, "Find Messages" 148, and "Options" 150 buttons. For each particular type of communication action, additional displays may provide the user with buttons or other labeled inputs for a function related to the particular type of communication action, and fields for information pertaining to the communication. For example, the message center 130 displays the button labeled "Send Messages" 146. Once this "Send Messages" button 146 is activated, the user may be provided with a list or display of different types or formats of messages. The display may include a button marked "e-mail". Once the e-mail button is activated, an e-mail form or template with fields, or additional buttons may appear to the user relating to the e-mail function. Also, fields may appear for information pertaining to the e-mail such as the destination for the e-mail, addresses to be copied with the e-mail, a subject matter for the e-mail, attachments for the e-mail, a text area for the e-mail, etc. The user activates the buttons and provides the information in the fields as appropriate.

In providing the user with communication functions, the message center 130 may interact with other features and functions of the CIR manager 10 and other elements. For example, the message center 130 allows the user to send a message by activating the "Send Messages" button 146. But to send the message, the message center 130 may require only a basic input from the user with respect to the identity of an addressee of an e-mail. The message center 130 interacts with the other features and functions of the CIR manager 10 to obtain information in addition to the basic input provided by the user.

As a specific example, assume the user desires to send an e-mail to a friend. The user may provide the friend's nickname as the basic input for the addressee of the e-mail. The message center 130 uses the friend's nickname to review the personal directories (if any) the user may have set up with the CIR manager 10. A personal directory may contain an entry for the friend, and the entry may include an e-mail address for the friend. The message center 130 obtains the friend's e-mail address from the personal directory, and supplies the e-mail address as appropriate to the fields relating to the e-mail destination so that the e-mail may be routed to the friend's e-mail address.

As another example, the message center 130 may interact with functions of the CIR manager 10 that obtain information from resources other than the user's data. For example, the CIR manager 10 may have information resources in a centralized location so as to serve many users. Also, CIR manager 10 may have access to third party information resources. Thus, assume a user desires to call a friend. The user may provide the friend's nickname as the basic input for the name of the called party. The message center 130 again uses the friend's nickname to review the personal directories of the user in the CIR manager 10. In this example, the personal directory may include an entry for the friend's nickname having the friend's full name, but the entry fails to include a telephone number for the friend. The message center 130 obtains the full name of the friend, and through other functions of the CIR manager, accesses the appropriate information resource (such as directory assistance) to obtain the friend's telephone number. Once the friend's telephone number is obtained, the telephone number may be entered into two places. First, the telephone number is included in the appropriate field so as to complete a telephone call to the friend at that telephone number. Second, the telephone number is included in the user's personal directory so that the next time the friend's telephone number is readily available from the user's personal directory.

Another example of interaction between the message center 130 and other functions of the CIR manager 10 is presented with respect to instant messaging and the memory functions of the CIR manager 10. Assume a user is working in do not disturb (DND) mode, and has implemented the DND mode so that no messages appear on the screen of the user. Instead, the received messages are logged into the message center 130, which displays message information relating to the messages. A new customer obtains the user's e-mail address, and sends an instant message to the user. Message information about the instant message is posted in an entry in the message center. The user may access the instant message by clicking on the entry. Data from the message information and from the instant message may be stored in appropriate directories and other places of the CIR manager 10. An embodiment of the CIR manager 10 queries the user prior to storing or otherwise processing information received in messages. Thus, the CIR manager 10 may query the user whether the information relating to the new customer should be stored. The CIR manager 10 may ask specific questions such as where the information should be stored, for how long the information should be stored, whether the information should be linked to other information, etc. The user may set default configurations for the storage of such information.

Exemplary Message Center—Summary Information

The CIR manager 10 may display summary information on the communications of the user and allow the user to take actions from such summary information. The summary information may be displayed (or not displayed) on the message center 130 in a manner per the preferences of the user.

The message center 130 also may include summary information on communications of the user, and allow the user to take action from such summary information. For example, the Inbox in FIG. 5A includes a summary display by type (voice, e-mail, fax, etc.) of the number of all messages versus new (All/New) messages directed to the user. In FIG. 5A, the summary display depicts that the user has 1/1 voice message 152, 3/3 e-mail messages 154, and 1/1 fax message 156. In an embodiment, the user may click-on a type of message to see all messages of that type or only the new messages of that type. For example, if the user clicked-on the display entitled "all" 158 and then on the display entitled "e-mail" 154, then a table of entries of message information relating to all of the user's e-mail messages may be displayed.

Exemplary Message Center—A User's Preferences

Advantageously, the CIR manager 10 is personalized to the user through its implementation of the user's preferences. A user's preferences may be implemented with respect to the display and function of the message center 130. When the user activates the message center 130, the CIR manager 10 recognizes the user and configures the display screen pursuant to the preferences of the user. These preferences may relate to the entry of message information in the message center 130, or other substantive information, may relate to the manner in which the message center 130 is displayed, or may relate to the provision of responses to messages.

By way of example, the user may decide against display of the summary information described in the previous section. In that case, once the preference is set, the CIR manager 10 configures the message center 130 so as not to include the summary information.

As another example, the user may prefer to see a table 132 including entries of message information in a particular format. The user may have the entries arranged in a table chronologically with the oldest first in the table, arranged by type with e-mail messages appearing first, arranged by importance with emergency messages appearing first, etc. If the message center 130 includes more than one table, logs, or sub-logs, then the user may specify which table, log or sub-log is to appear first in a display of the message center, which tables or logs are to appear concurrently, etc.

The preferences of a user do not have to be data substantive such as being related exclusively to the messages or communications. For example, the user may prefer the display of the message center 130 not take up the entire display screen of the computer. Thus, the CIR manager 10 configures the message center per the user's preference. The preferences may include display of personalized features in the message center 130 such as a quote-of-the-day, sports scores, stock indices, weather reports, breaking news, or other information.

Further, the personalized features may be directed to the manner of display of any information in the message center 130 rather than to the information itself. For example, a user may prefer the background of the message center 130 to be white, for entry information on unread messages to be displayed in red and in a big font, for entry information on read messages to be displayed in blue and in italicized form, for non-message information (such as quote-of-the-day, etc.) to be in green with active graphics, etc. The recognition of the user and display of information per the user's preferences facilitates the user's use of the CIR manager 10 and generally makes the CIR manager 10 more personal and user-friendly. In this example, the user prefers a quote-of-the-day 160 to appear on the upper right hand of the display as illustrated in FIG. 5A.

Alternative Embodiments of a Message Center

In some embodiments, the message center may be referred to as a communications manager or a message log. In an alternative embodiment, the functions of the message center in keeping track of communications in a table including entries of message information or the like may be carried out by a communications manager. In this alternative embodiment, the functions of the message center in providing or displaying summary information may be carried out separately from the communications manager by a message center.

Figure 6:
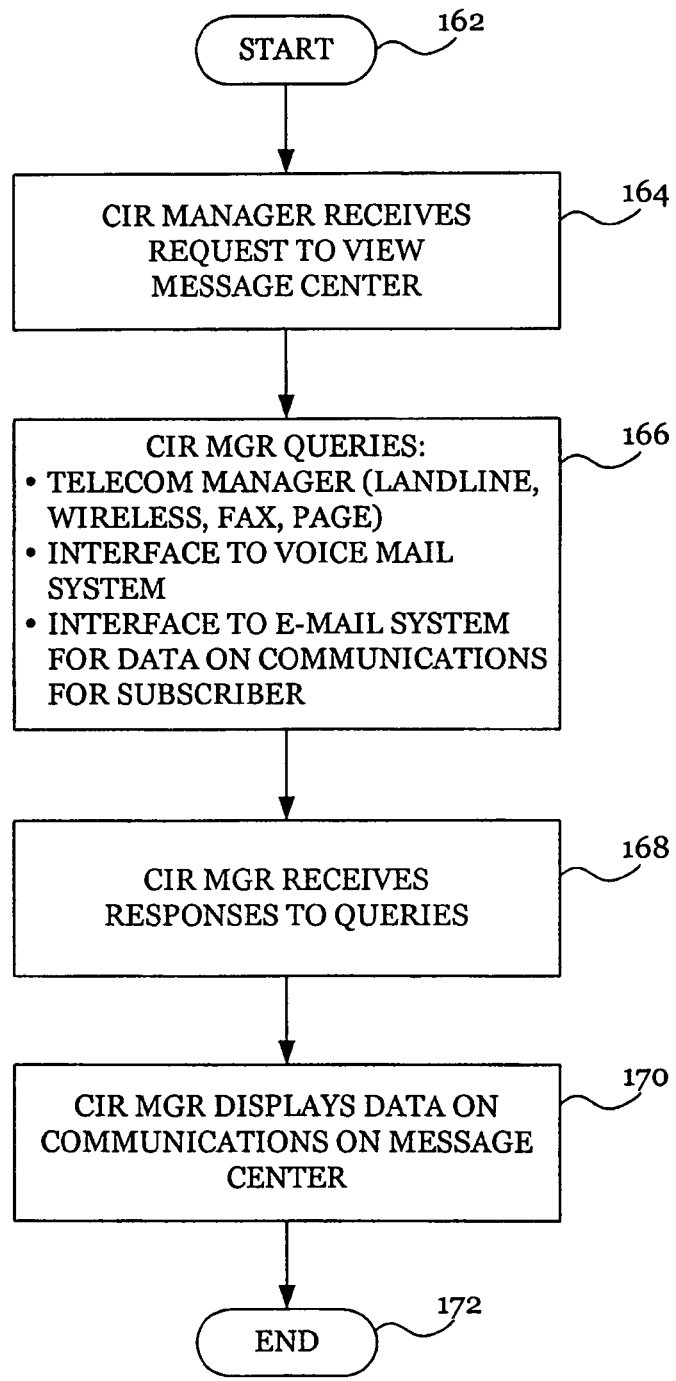
FIG. 6 is a flow diagram illustrating actions of an exemplary CIR manager.

Access to the Exemplary Message Center—FIG. 6

The CIR manager 10 may receive instructions in any number of ways from a user to display the message center 130. A typical input method may be by way of clicking-on a message center button on a dotcomm program icon. FIG. 6 illustrates a flow diagram of the actions that may be taken by the CIR manager 10 to cause entries of message information in the message center 130 to be displayed. After start action 162 and receipt of the request to view the message center 130 in action 164, the CIR manager 10 takes action 166 to obtain the information for inclusion in the display of the message center. For example, the CIR manager 10 may communicate through the gateway 28 over the Internet or otherwise to a telecom manager 40 through the PSTN 38 to obtain information related to the user's communications. Through the telecom manager 40, the CIR manager 10 may request information on wireline (also referred to as landline), wireless, fax, and page communications relating to the user. As another example, the CIR manager 10 may communicate with a voice mail system 34 and/or an e-mail system for data on communications relating to the user. Further, the CIR manager 10 may communicate with other information sources as appropriate to obtain information on communications relating to the user.

To make the queries of the telecom manager 40, the voice mail system 34, the e-mail system (not illustrated), or other information source, the CIR manager 10 is provided during set-up with data relating to the services serving the user. The CIR manager 10 also may be provided with identification information and preferences related to the user so the queries may appropriately reference the user. For example, at set-up, the user may provide identification information related to his or her use of a particular voice mail service.

The CIR manager 10 may include applications or control logic to query the appropriate resources for information on communications of the user. As noted above, the CIR manager 10 may communicate directly over the PSTN or the Internet with elements, systems, or networks for some communications information. The CIR manager 10 also may interface with the gateway 28 in the Internet 26 and/or with the telecom manager 40 in the PSTN 38. The gateway 28 or the telecom manager 40 may be able to provide the communications information or to retrieve it from other elements, systems or networks.

In action 168, the CIR manager 10 receives the responses to the queries. In an exemplary embodiment, the CIR manager 10 may receive only limited data relating to the communications of the user in the responses to the queries. For example, the limited data may include information such as source of the communication ("from"), destination of the communication ("to), copied parties ("cc"), blind copied parties ("bcc"), subject, date, time, size, and status of the communication (whether it has been read, its priority, its level of confidentiality, etc.), and whether the message or communication includes any attachments or other connections.

In particular, the CIR manager 10 may receive the following information as limited data for each type of communication Telephone Call
    Called number
    Calling number
    Date
    Time
    Duration
    Page
    Paged number
    Paging number
    Date
    Time
    Length
    Voice Mail
    Calling number
    Date
    Time
    Facts about voice mail attachment such as size, format, length
    Auto-reply possibility or lack thereof
    E-Mail
    E-mail address of addressee
    E-mail address of sender
    E-mail address(es) of others (cc's, etc.)
    Date
    Time
    Subject matter of e-mail
    Facts about e-mail message and/or any attachment such as size, format, features (confidential, important, etc.)
    Indicator of any related messages Tab for access to other messages from the sender
Fax
Fax number and telephone number of addressee
Fax number and telephone number of addressor
Fax number and telephone number of others
Date
Time
Facts about fax message such as size, page number, format, features (confidential, important, etc.)

The CIR manager 10 may receive the limited data in its native format, and may convert the limited data into a format used by the user. Alternatively, the limited data may be converted into a format used by the user at the gateway 28 or the telecom manager 40 prior to transmission of the limited data to the CIR manager 10.

The limited data typically does not include the substance of the message or communication. Thus, in this exemplary embodiment, the CIR manager 10 may receive the limited data relating to the communication, but not the substance of the communication itself. The substance of the communication may remain with the system, service, manager, or network queried by the CIR manager 10, or with the gateway 28 or the telecom manager 40.

Advantageously, the transfer of only limited data to the CIR manager 10 saves resources. (The limited data also may be referred to as message information.) For example, assume the CIR manager 10 queries an e-mail system (not illustrated in FIG. 2) for communications relating to the user. The e-mail system may respond with limited data on the e-mails relating to the user. The CIR manager 10 receives the limited data and causes the limited data to be displayed in entries of message information in the table 132 of the message center 130. Should the user desire to see the substance of any particular e-mail, then the user may select the entry of message information relating to the particular e-mail. In response, the CIR manager 10 obtains the substance and causes the substance of the e-mail to be displayed to the user in the GUI. Additional information about the selection and access to communications by a user is provided below in connection with a discussion of FIG. 7.

In alternative embodiments, the CIR manager 10 may receive more than limited data relating to the communications of a user. The CIR manager 10 may receive, in response to its queries, the substance of the communications as well as limited data or message information related to the communications. In these alternative embodiments, the CIR manager 10 may store or otherwise hold the substance of the communications in memory or otherwise at least until the user selects a communication and indicates a desire to review its substance. As with the limited data, the CIR manager 10 may receive the substance of a communication in its native format, and may convert the substance into a format used by the user. Alternatively, the substance may be converted into a format used by the user at the gateway 28 or the telecom manager 40 prior to transmission of the substance to the CIR manager 10.

In action 170, the CIR manager 10 uses the data from the responses to cause the message center 130 to display the message information relating to the communications of the user. For example, the information may be displayed in a table 132 of the message center 130 in a manner like that illustrated by the entries of message information 134, 136, 138, 140, 142 in FIG. 5A. The flow diagram of FIG. 6 concludes in end action 172.

Figure 7:
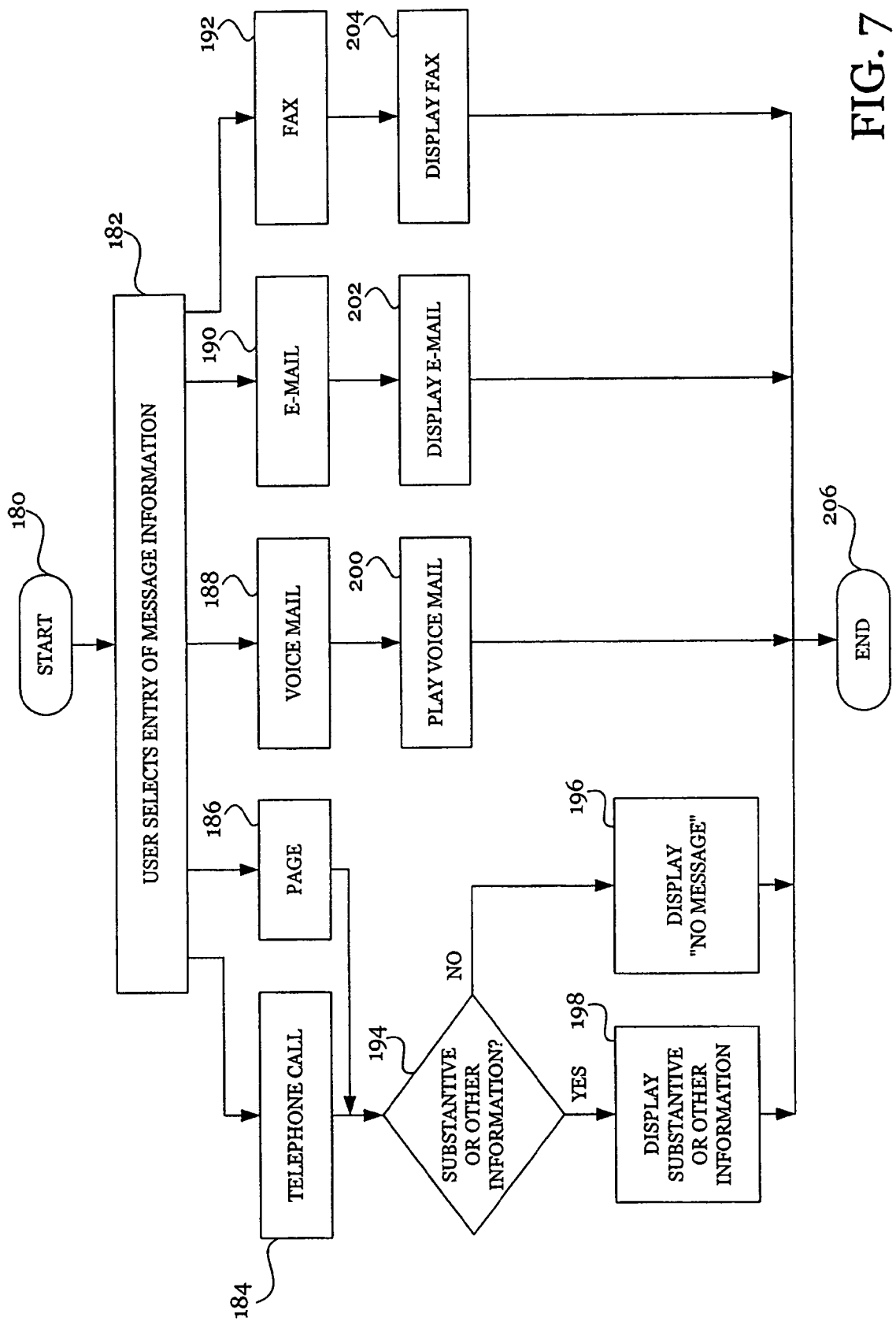
FIG. 7 is a flow diagram illustrating actions of an exemplary CIR manager.

Review of a Message Using the Exemplary Message Center—FIG. 7

The message center 130 may be used by a user to select and review the substance of a communication. The communication may be any message to which the CIR manager 10 may have access. FIG. 7 is a diagram illustrating the actions of the CIR manager 10 in response to a user's selection of a communication to review. For example, to review a communication, the user may click-on one of the entries of message information in the table in the message center. After start action 180 and receipt of the selection of a message to review in action 182, the CIR manager 10 obtains the substance of the communication from the appropriate source such as from storage where the CIR manager 10 may have stored the substance, through the gateway 28 in the Internet 26, from the telecom manager 40 in the PSTN 20, or from elsewhere. The CIR manager 10 causes the substance of the communication to be made available to the user.

The manner in which the substance of the communication is made available to the user generally depends on the communication's type as explained below with respect to each exemplary type of communication. Nonetheless, in some cases, the user may elect to have a message received in a first type or format to be presented in a different type or format of message. For example, an e-mail may be received for the user; yet, the user may elect to have the substance of the e-mail read aloud to him or her. To accommodate the change in type or format of a message, the CIR manager 10 may include or have access to applications, appropriate devices or systems to make such changes. For example, if a user chooses to have e-mails read aloud, then the CIR manager 10 may need to include or have access to a text-to-speech converter.

FIG. 7 illustrates that in the exemplary embodiment a communication may be of the following type: a telephone call 184; a page 186; a voice mail 188; an e-mail 190; or a fax 192. For example, an entry of message information in a table of the message center may relate to a telephone call 184, and the user may select the particular entry for review of substance or other information associated with the entry. But with an entry relating to a telephone call there may or may not be any substance or other information as action 194 of FIG. 7 illustrates. The entry of information may fail to include any substance or other information in the case where the entry includes all of the information related to the receipt of the telephone call for the user. For example, the entry may include all of the information related to the telephone call if the user has configured the entries of message information to include all information or data that would be received by the CIR manager 10 in connection with a telephone call. In the case of no substantive information, as indicated by action 196, the CIR manager 10 may cause the message center 130 to display or announce a "No message" announcement to the user in response to the selection of that particular entry.

Alternatively, the entry of message information relating to the receipt of the telephone call for the user may be linked to substantive or other information associated with the call. Thus, if the user selects an entry for a telephone call, the information relating to the telephone call and categorized as substantive or other information may be obtained and displayed on the display monitor or otherwise presented to the user as indicated by action 198. The CIR manager 10 obtains the information from the appropriate source such as from storage, the gateway 28 in the Internet 26, the telecom manager 40 in the PSTN 38, or elsewhere.

For example, assume a user prefers that entries of message information only contain the following fields: "From"; and "Calling Number". In that case, the entry of message information related to the selected telephone call may be linked to other information such as date, time of the call, etc. By clicking-on the particular entry, the date, time of the call and other information may be displayed or otherwise presented to the user. In some embodiments, the CIR manager 10 may augment message information with information the CIR manager 10 may have stored and to which the CIR manager 10 may have access. For example, assume an entry of message information includes "Unknown" in the "From" field, but includes a telephone number in the "Calling Number" field. The CIR manager 10 may use the telephone number to search information resources so as to include the appropriate data in the "From" field. For example, the telephone number may correspond to a friend of the user's based on information in a personal directory created by the user and stored on the CIR manager 10.

A selection by the user of an entry of message information related to a page 186 is treated generally in the same way as the selection of an entry of message information related to a telephone call 184 as described in the previous paragraphs. The entry relating to the page 186 may or may not have substantive or other information linked to the entry. If there is no substantive or other information, then the CIR manager 10 may cause the "No message" announcement to be displayed or presented to the user. If there is substantive or other information, then the CIR manager 10 may cause the display or announcement of that substantive or other information.

A selection by the user of an entry of message information related to a voice mail 188 generally results in the CIR manager 10 obtaining the voice mail (in the form of a WAV file or other) from storage, a voice mail system 34, the gateway 28 in the Internet 26, the telecom manager 40 in the PSTN 38, or otherwise. As illustrated in action 200 of FIG. 7, the CIR manager 10 causes the voice mail to be played or otherwise presented to the user.

A selection by the user of an entry of message information related to an e-mail 190 or a fax 192 results in similar actions to those explained in the previous paragraphs. The CIR manager 10 obtains the e-mail or the fax from the appropriate source such as storage, an e-mail system, a fax device or system, the gateway 28 in the Internet 26, the telecom manager 40 in the PSTN 38, or elsewhere. After retrieval, the e-mail is displayed or otherwise presented as noted in action 202, and/or the fax is displayed or otherwise presented as noted in action 204.

The actions connected in obtaining and presenting the substantive or other information related to limited data of an entry of message information end in action 206 of FIG. 7.

Figure 8:
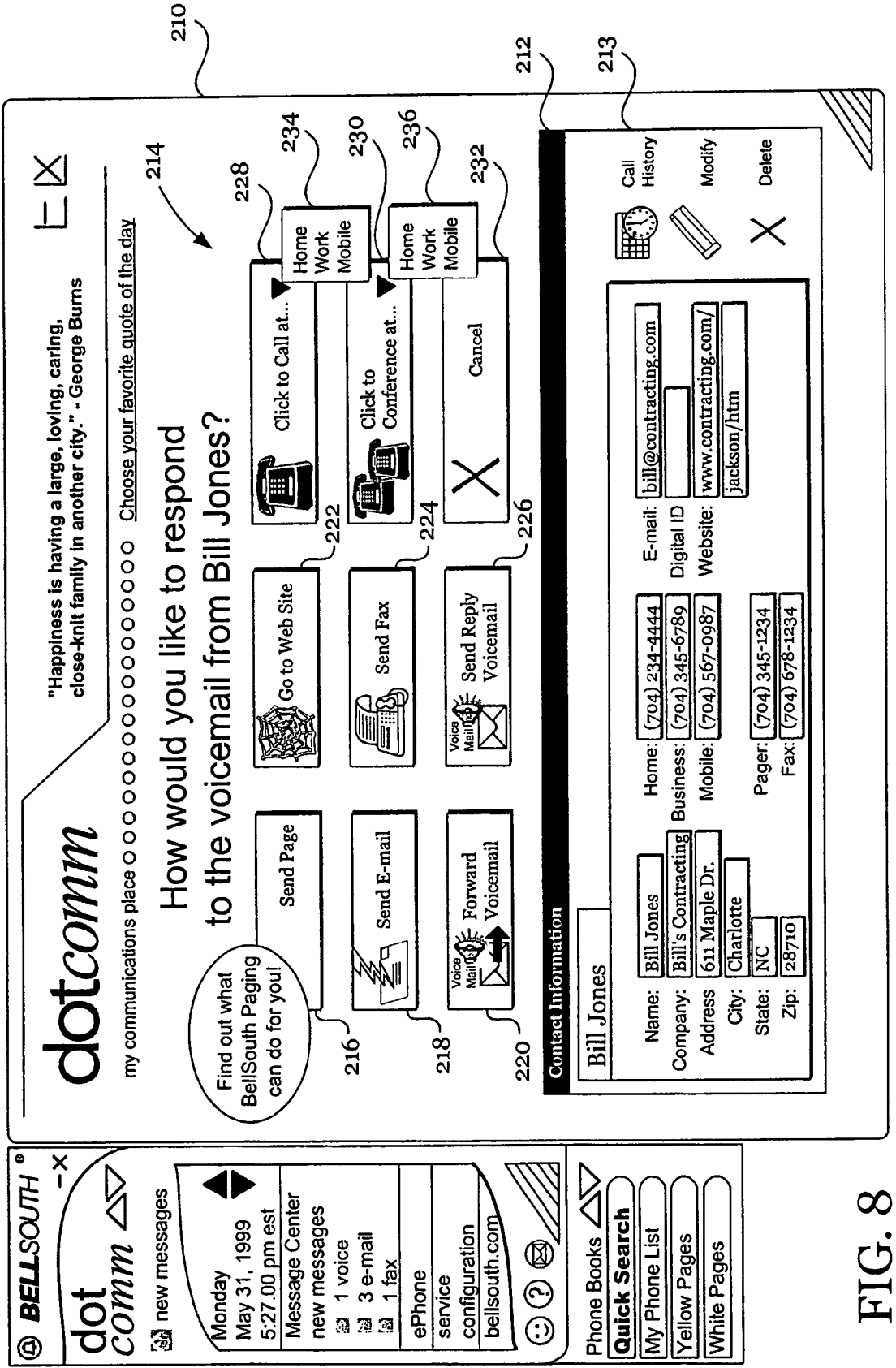
FIG. 8 illustrates an exemplary screen of a computer displaying features and functions of an exemplary CIR manager.

Sending of a Message—FIG. 8

The CIR manager 10 allows a user conveniently to create and send messages of various types. Generally, an exemplary CIR manager 10 gathers the appropriate information for the message from the user, contacts the appropriate messaging service or application, and provides the information so as to cause the message to be sent. Of course, some CIR managers may include their own messaging systems.

In general, to send a message, the user activates the send message feature by clicking-on an appropriate input such as the "send message" 46 button illustrated in the message center 130 of FIG. 5A, or otherwise. Once the send message feature is activated, the user may select a type of message to send. For example, the user may decide to make a telephone call, or send a voice mail message, a page, a fax, an e-mail, an instant message, etc. Advantageously, the CIR manager 10 responds to the message type selection by providing the user with the appropriate template or other base for generating the message. For example, if the user elects to send an e-mail, then the CIR manager 10 may provide the user with a display of a blank e-mail message template on the display screen of the PC 24.

In addition to choosing a type of message, the user provides identity information with respect to the message. In an exemplary embodiment, the user need provide only minimal identification information, and the CIR manager 10 responds by obtaining the remaining information necessary for sending the message pursuant to the user's selection. For example, the user may decide to send an e-mail message to Dale Malik. Advantageously, the CIR manager 10 may respond to the input of Dale Malik's name by obtaining the remaining information necessary for the sending of the e-mail message to Dale Malik. If the user inputs "Dale Malik" or even just "Dale" into the "To:" field of the e-mail message template, then the CIR manager 10 may obtain the remaining information from one or more sources. These sources may include the directories set up for the user in the CIR manager 10. These sources also may include other information resources to which the CIR manager 10 may have access through the PSTN 38 and the Internet 26.

In sending a message, the user may provide the substance or other information related to the communication. For example, if the user is sending an e-mail message, a fax, or a page, then the user may supply information for the subject matter of the message or the text of the message in the e-mail message template, a fax template, or page template. As another example, the user may elect to send a voice mail message. In response, the CIR manager 10 provides for the recording of the voice mail message from the user. If the user decides to make a telephone call, the CIR manager 10 may take actions to place the call through the PSTN 38 and/or the Internet 26.

The identity information and other information related to the message is provided by the CIR manager 10 to the appropriate messaging service or system. As noted, the messaging service or system may be a part of the CIR manager 10, may be included among the applications of the PC used by the user, may be a separate element accessible directly or through networks by the CIR manager 10, may be incorporated in or accessible through the gateway 28 in the Internet 26, or may be included in or accessible through the telecom manager 40 in the PSTN 38.

Referring to FIG. 8, an example is provided of the actions that may be taken by a user in response to receipt of a voicemail. Even though this example particularly concerns a response to a voicemail, generally the actions described relate to other features and functions of the CIR manager 10 such as the creation of messages, forwarding of messages, etc.

Assume a user has received a voice mail from Bill Jones, has selected the entry of message information related to that voice mail from a table or log in the message center, and has listened to the voice mail. At the end of the presentation of the voice mail, the CIR manager 10 may offer the user an opportunity to respond to the voice mail. If the user provides a positive indication, then the CIR manager 10 may display a responsive action GUI 210 on the display screen or monitor of the PC 24 such as illustrated in FIG. 8. The responsive action GUI 210 may present the user with a question: "How would you like to respond to the voice mail from Bill Jones?" In addition, the CIR manager 10 may cause the responsive action GUI 210 to include: contact information 212 regarding the prospective recipient of the message; and communication options 214 for the type of message to be sent to the addressee.

With respect to the contact information 212 about the prospective recipient of the message, the CIR manager 10 determines the recipient is "Bill Jones" based on the user's indication of interest in responding to the voice mail from "Bill Jones". The contact information 212 on Bill Jones presented to the user may include the following: name, company, address (including city, state, and zip), home telephone number, business telephone number, mobile phone number, pager number, fax number, e-mail address, digital identifier, website address, and other contact information. The CIR manager 10 may obtain the contact information 212 (in whole or in part) from one or more sources. For example, the CIR manager 10 may be able to obtain some of the contact information 212 from the limited data associated with the voice mail message from Bill Jones as contained in an entry of message information related to that voice mail message. If the CIR manager 10 obtains contact information 212 from the limited data or the entry of message information, then the CIR manager 10 may add the obtained contact information to one or more directories of the user. Advantageously, the CIR manager 10 obtains the appropriate data for responding to a message, and also adds to or updates directories of the user, unless of course, the user has indicated a preference for not adding such information or updating the directories.

The CIR manager 10 also may consult the user's directories as stored in the CIR manager 10 to obtain the contact information. In addition, the CIR manager 10 may consult (over the Internet 26, through the PSTN 38, or otherwise) other information resources such as white page directories, directory services, etc. The CIR manager 10 may consult the information resources directly or may operate through the gateway 28 in the Internet 26 or the telecom manager 40 in the PSTN 38. Advantageously, the CIR manager 10 may add or update directories of the user with the information obtained from other sources, unless of course, the user has indicated a preference for not adding such information or updating the directories.

The contact information 212 relating to the addressee of a message also may be changed or edited by the user. As an example, the user may add an additional person as the recipient of the message.

Also, the contact information 212 may allow the user to view information correlated to the information identified in the contact information 212 or to the topic of the message. For example, correlated information may include communication history relating to the information identified in the contact information 212. The user may desire to see the history of messages between the user and Bill Jones. In that case, the user may activate a message history button and a history of the messages between the user and Bill Jones may be displayed. FIG. 8 illustrates a "call history" button 213 as the message history button. The history of the messages may be presented in summary form such as in a table including entries of message information relating to the calls between the user and Bill Jones. If the user selects and activates one of the entries of message information from the table, then the substance of that communication may be displayed to the user. For another example, correlated information may include a list or other information on messages sharing the same topic.

With regard to the communication options 214, FIG. 8 illustrates that this exemplary embodiment of the CIR manager 10 allows a user to respond to a voice mail by any of the following actions: send page 216; send e-mail 218; forward voice mail 220; go to web site 222; send fax 224; send reply voicemail 226; call at a selected number 228; conference call at selected numbers 232; or cancel the response to the voice mail 232. If the user selects any of these communication options (except cancel 232), then the CIR manager 10 obtains the appropriate information from the contact information 212 relating to the addressee such as Bill Jones. If, however, the user chooses either the call option 228 or the conference all option 230, then the user may have to indicate what number to use for the call. For example, the recipient (Bill Jones) may be called at his home, office, or on his mobile phone. The user provides an indication as to which number to call. This indication may be made by choosing a phone number from a drop down menu presented in connection with each of the communication options 228, 230. Call option 228 includes a drop down menu with choices 234; and conference call option 230 includes a drop down menu with choices 236.

A Call in Progress—FIGS. 9-12

The CIR manager 10 includes features so the user may elect to be presented information in a GUI on the display screen of his or her PC 24 while the user is engaged in a communication. FIGS. 9-12 illustrate examples of such information presentation.

Figure 9:
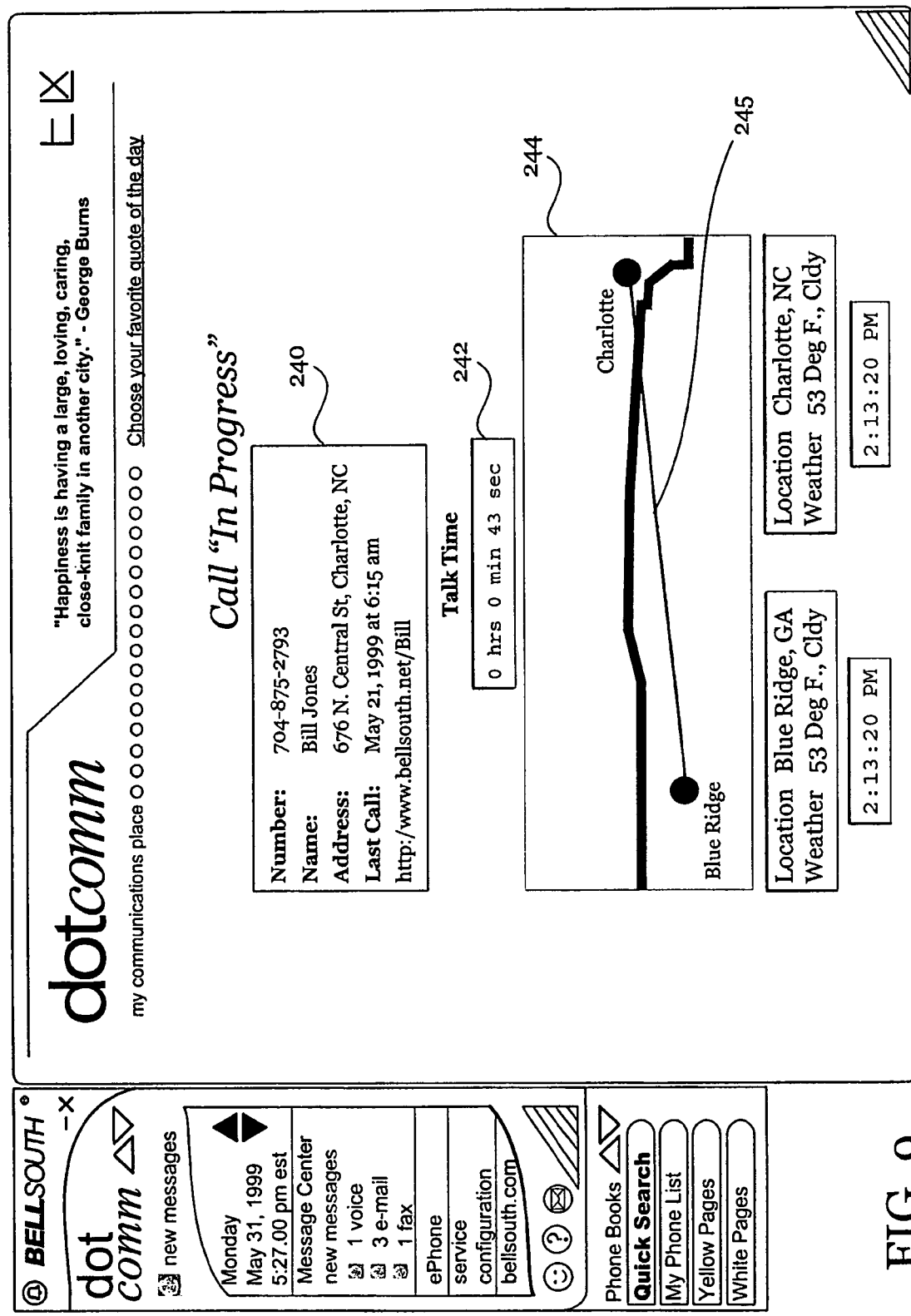
FIGS. 9, 10, 11, and 12 illustrate, respectively, exemplary screens of a computer displaying information presentations of an exemplary CIR manager.

Referring to FIG. 9, assume a user elects to make a telephone call to another person such as Bill Jones. After activation of the call button and selection of the appropriate telephone number, the call is made. While the call is being made, the CIR manager 10 may present the user with a display of an information box 240 containing the number being called, the name and address of the called party, and other information such as the date of the last call to, from, or with the called party. In addition, information on other types of communications (other than telephone calls) to, from, or involving the called party may be displayed. Once the call is connected to the called party, the user may be presented with a talk time box 242 containing information on the duration of the call.

In addition, the user may be presented with a map box 244 including a map with the locations of the calling party (the user) (Blue Ridge, Ga. in the example) and the called party (Charlotte, N.C. in the example). Also in the map box 244 of the example, a straight line 245 is drawn on the map between the locations of the respective parties. As a further aid to the user, the map box 244 may include other information such as the respective locations of the parties, and/or the weather and time at each respective location.

Figure 10:
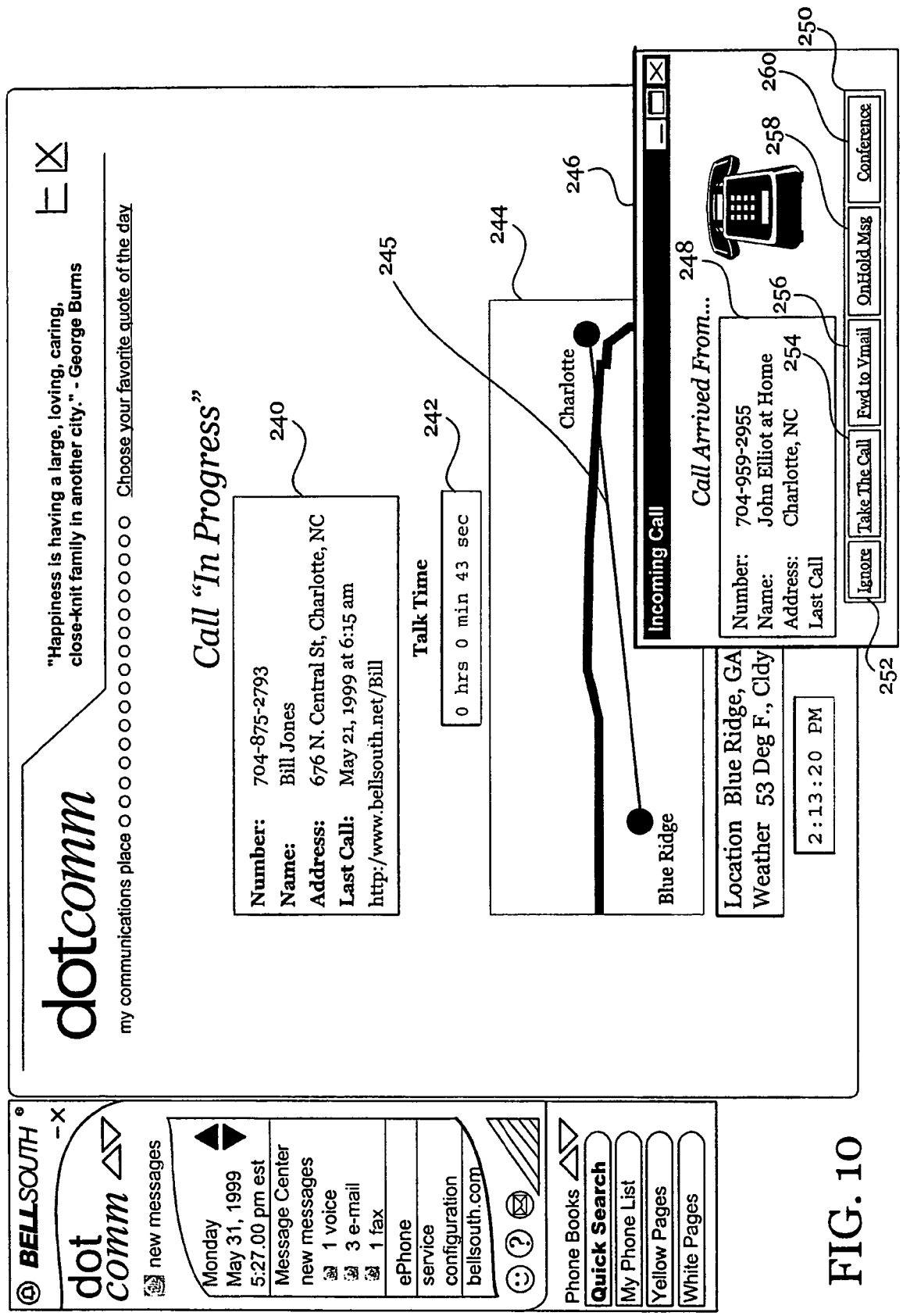

FIG. 10 illustrates information that may be presented to the user engaged in a communication when another communication is received for the user. In this example, the received communication is a call from a third party. But the communication may be any type of message received for the user. The CIR manager 10 may overlay the GUI presentation of the information box 240, the talk time box 242, and the map box 244 with an incoming call box 246. The incoming call box 246 may include identification information 248 related to the communication from the third party.

As noted above, the CIR manager 10 may include a response capability to messages received for the user. The response capability may be implemented to automatically send a response, or to automatically query the user whether to send a response to the message received. In the example discussed in connection with FIGS. 9-12, the response capability is implemented so as to query the user whether to send a response. The available selected responses for this example are illustrated generally as action features 250 in FIG. 10.

Specifically, the action features 250 include: ignoring the call ("ignore") 252; taking the call 254; forwarding the call to voice mail 256; playing an on-hold message to the call 258; and linking the received call to the on-going communication in a conference call 260. The CIR manager 10 generally implements the action features 254, 256, 258, 260 directly or through the gateway 28 in the Internet 26, in connection with the telecom manager 40 in the PSTN 38, or otherwise. The CIR manager 10 causes the selected response to be made. Further, the CIR manager 10 may cause information related to the received message and to any response to be logged into an entry or entries in a table of communications related to the user. Thus, the user may be able to keep track of who called and what action was taken in response to the call. Further, the caller may be able to tag or flag the appropriate entry so as to be able to quickly find it, review it, and act on it, if appropriate.

If the user chooses the action feature "ignore" 252, then the incoming call is not terminated to the user. Nevertheless, the CIR manager 10 may log an entry in a table relating to a user's communications (and available at the message center 130) about the attempt at communication represented by the incoming call. If the user chooses the action feature "take the call" 254, the user's conference call is ended, and the user effectively is switched to the incoming call. The CIR manager 10 may include a link or information relating to the received call in any logged entry relating to the conference call.

If the user chooses the "Fwd to Vmail" 256 action feature, then the CIR manager 10 causes the incoming call to be terminated to the appropriate voice mail system of the user. The CIR manager 10 may include a link or information relating to the received call in any entry relating to the conference call that may be logged. If the user chooses the "OnHold Msg" 258, then the CIR manager 10 causes a announcement to be made to the caller. The announcement may request the caller to "please hold". When the conference call is ended, the received call may be connected to the user. The CIR manager 10 may include a link or information relating to the received call in any logged entry relating to the conference call. Prior to the conference call ending, and even after the "please hold" announcement is provided to the caller, the user may decide to take some other action with respect to the incoming call such as any of the other (except "ignore" 252) action features described herein.

Figure 11:
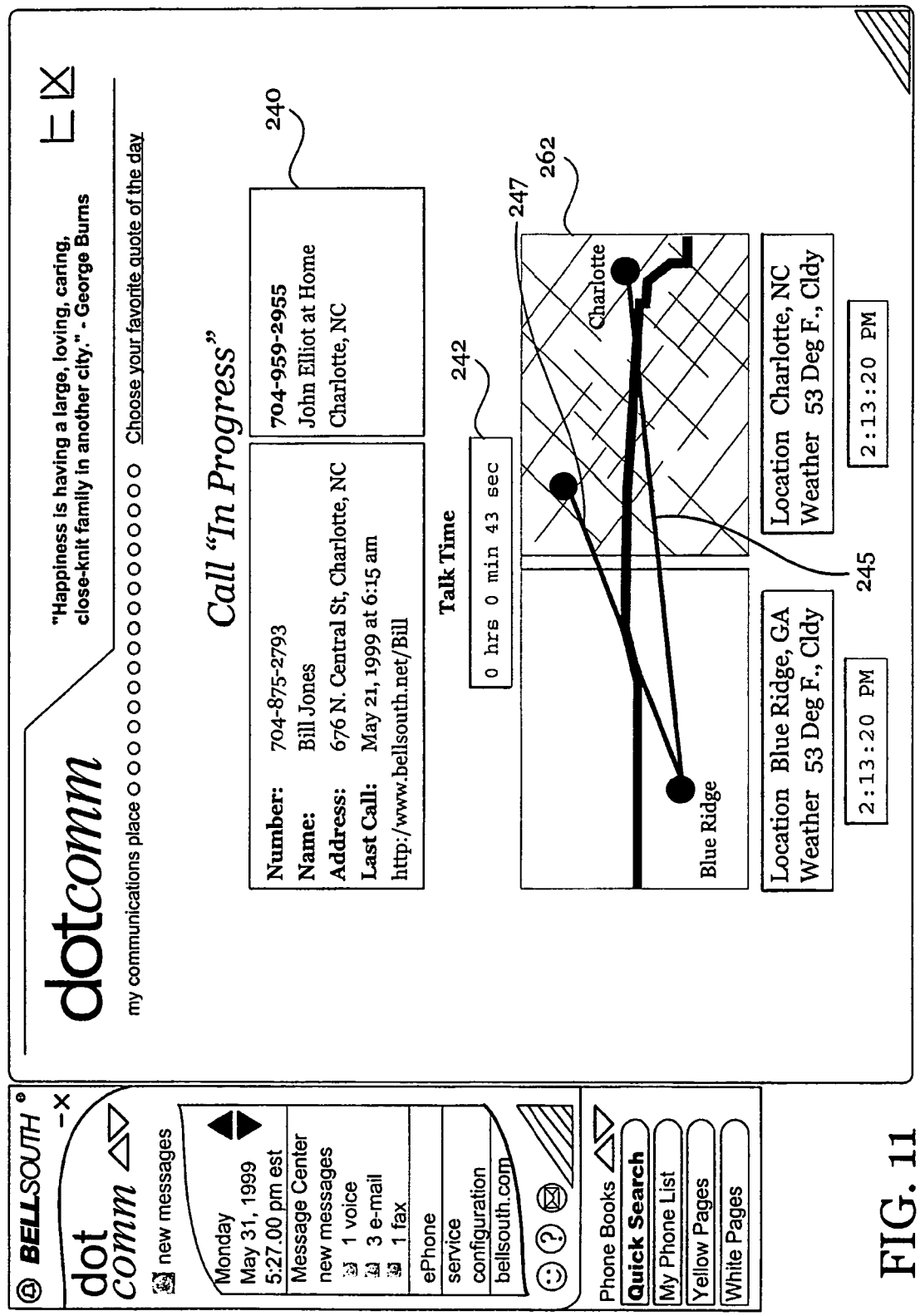

Another action feature that may be selected by a user is the "Conference" 260 action feature. By choosing this "Conference" feature, the user may include the caller of the incoming call in the conference call taking place. FIG. 11 illustrates information that may be presented to the user engaged in a first communication, when the user activates the conference call action 260 to link a second communication to the first. In particular, the map box 262 presented to the user may change so the map includes the locations of the parties involved in the conference call. In this example, a line 245 on the map connects the user's location to the location of the party associated with the first communication, and another line 247 connects the user's location to the location of the party associated with the second communication. In addition, the information presented with the map box 262 may include location, weather, and time related to one or more of the parties involved in the conference call. Also, the CIR manager 10 may include a link or information relating to the received call in any logged entry relating to the conference call.

Figure 12:
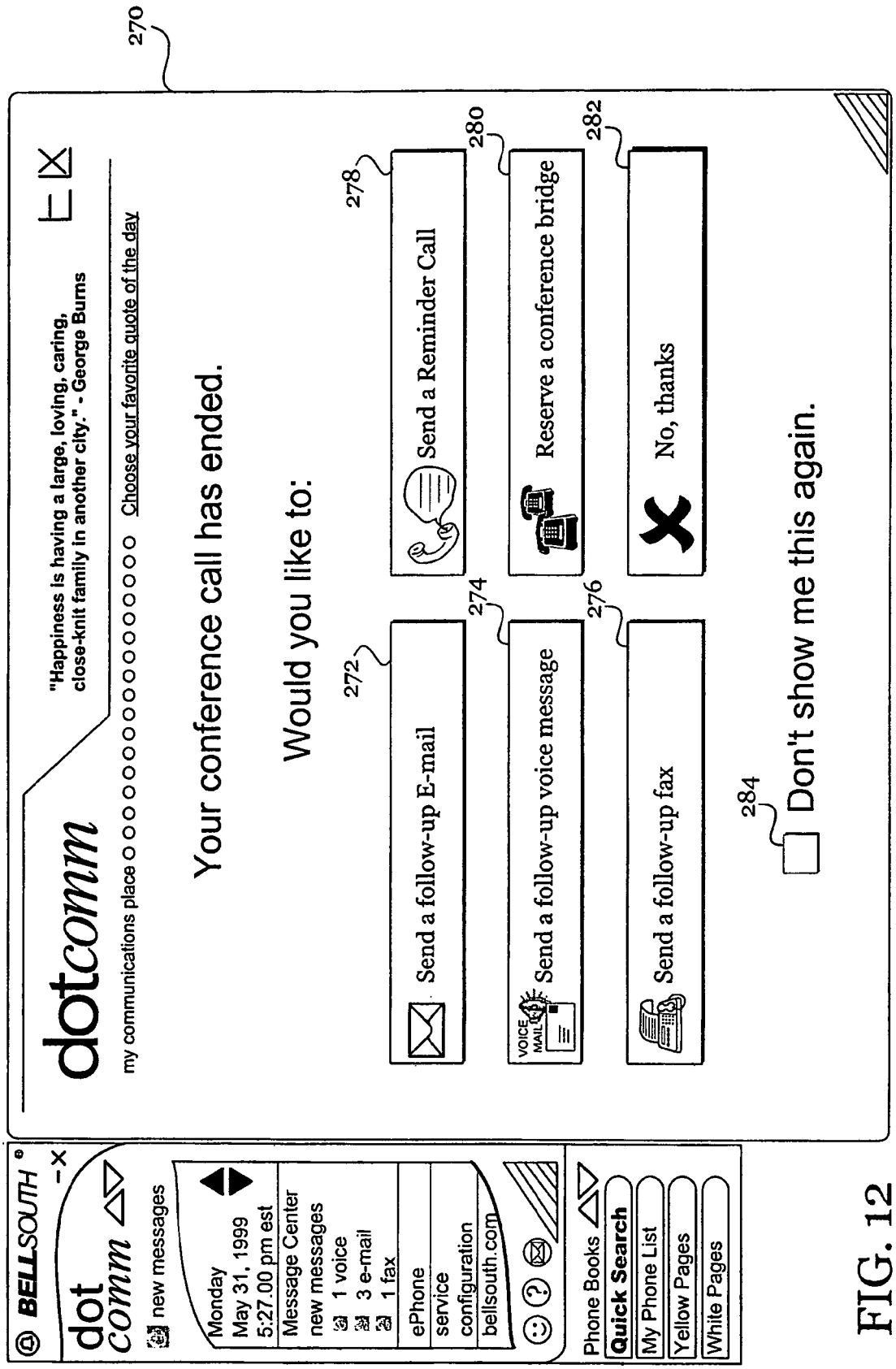

FIG. 12 illustrates information that may be presented to the user when the CIR manager 10 determines the conference call has ended. In this example, a box 270 may present the user with options as a follow-up to the conference call. The options may include sending a follow-up e-mail 272, sending a follow-up voice message 274, sending a follow-up fax 276, sending a reminder call 278, reserving a conference bridge 280, or a no action option 282. If the user chooses any option other than the no action option 282, then the CIR manager 10 proceeds with implementing the selected option. Advantageously, the CIR manager 10 may obtain information necessary to implement the selected option from information collected in connection with the terminated conference call, from storage or directories of the CIR manager 10, or from other sources accessible to the CIR manager 10. This advantage provides the user with efficient and convenient communication possibilities.

As noted, the CIR manager 10 may keep track of a user's communications by logging entries (related to the user's communications) in a table available to the user through the message center 130. Referring to the conference call example discussed above in connection with FIGS. 9-12, the CIR manager 10 may include an entry related to the conference call in a table (or tables) as set up by the user. The entry related to the conference call may include information or a link to any entry created with respect to any message received while the user was engaged in the conference call, and any response made to the any messages received. Also, the entry related to the conference call may include information or a link to any entry created with respect to any follow-up option relating to the conference call selected by the user.

As an example, assume the user has selected sending a follow-up e-mail as the selected option to a terminated conference call. In that case, the CIR manager 10 may present the user with an e-mail template. In the course of presenting the e-mail template, the CIR manager may obtain information relating to the e-mail, and fill in the appropriate fields in the e-mail template with the obtained information. For example, if the user has been involved in a conference call, then the CIR manager 10 may address the e-mail to the other parties participating in the conference call. The CIR manager 10 may use the names of the parties or other information to obtain the e-mail addresses of the other parties from storage or directories of the CIR manager 10, from the telecom manager 40 in the PSTN, from the gateway 28 in the Internet 26, or from some other information resource. Information relating to the follow-up e-mail may be logged as an entry in a table relating to the user's communications, and the entry may include a link or information related to the conference call.

An advantage of the CIR manager 10 is that it allows the user to customize the services provided. For example, the user may choose not to be presented with options after a conference call has ended. If the user does not want to be bothered with such options, then the user may activate the "Don't show me this again" choice 284 of box 270 as illustrated in FIG. 12. As a result of such activation, the CIR manager 10 does not thereafter present the user with a follow-up conference call box 270 after the termination of a subsequent conference call.

The examples described in connection with FIGS. 8-12 relate to telephone calls and the information presented to the user in connection with such telephone calls. As noted, the communications received by a user may be of different types, and responses to the receipt of such communications provided by the CIR manager 10 may have different action features than those described above. The CIR manager 10 presents action features and different information presentations as appropriate to the type of communication or message being handled.

Generally, a user engaged in an interactive type of communication such as a telephone call or a conference call may be presented with information relating to receipt of an asynchronous communication or message such as an e-mail, page, instant message, fax, etc. The CIR manager 10 may be configured to respond to the receipt of an asynchronous communication with a standard or default response while the user is engaged in the interactive type of communication. The user, however, may desire to respond or otherwise interact with the sender of the received asynchronous communication. If so, then the user terminates the interactive communication in progress, and proceeds to respond to or otherwise interact with the sender of the received asynchronous communication.

For example, while engaged in a conference call, the user may receive an e-mail from a sender who is not participating in the conference call. Upon receipt of the e-mail from the sender, the CIR manager 10 may be configured to alert the user in some manner with regard to receipt of the e-mail. For example, the CIR manager 10 may cause the user to be provided with an audible indicator such as a "ping" or other noise or announcement such as "e-mail received". The CIR manager 10 also (or in the alternative) may cause a visible indicator such as a window or other indicator to "pop-up" or appear on the user's computer screen or other display device being used by the user during the conference call. The visible indicator may be a simple indicator to provide notice of the receipt of the e-mail; or the visible indicator may be complex and include information about the e-mail such as an identity of the sender, topic, etc. To view more information regarding the received e-mail and/or to view the substance of the e-mail, the user may click-on the visible indicator (whether complex or simple).

In this example, the CIR manager 10 may be programmed to automatically respond to the sender of the e-mail that the user is engaged in a conference call. Also, in this example, the CIR manager 10 may log the receipt of the e-mail into the appropriate table relating to the communications of the user. If the user desires to respond to the e-mail or to otherwise interact with the sender, then the user ends the conference call and takes up communicating with the sender of the e-mail.

Figure 13:
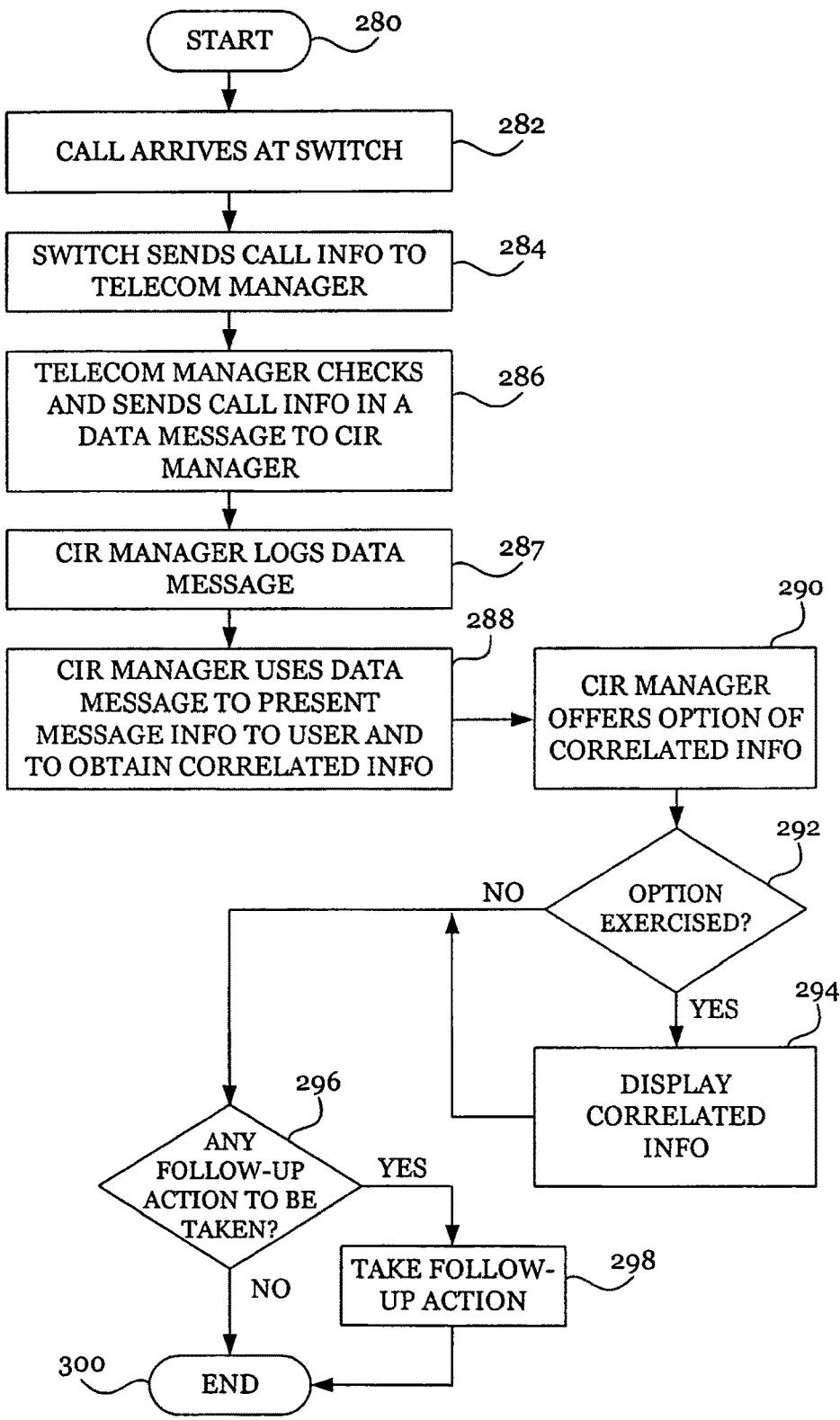
FIG. 13 is a flow diagram illustrating actions of an exemplary CIR manager.

Receipt of a Message for the User—FIG. 13

The CIR manager 10 may give notice of and facilitate the presentation and delivery of a message to a user. In addition, the CIR manager 10 may keep track of the message by including information related to the message in a log or table accessible to the user. The messages may include telephone calls, voice mails, faxes; pages, e-mails, instant messages, chat room communications, and the like. The CIR manager 10 serves as a manager or centralized system and method for organizing, displaying, reviewing, and following-up on a user's messages and engaging in other communication activities. Information about all of the messages received for a user may be presented to the user in a single display on a single device. Advantageously, the user does not have to separately check the PC for e-mails, the pager for pages, the fax machine for faxes, the voice mail system for voice mails, etc. The user simply may review the information presented by the CIR manager 10 to receive a summary of communication activities.

But the CIR manager 10 is more than an organizer of summary information on messages of the user. An example of the organization function of the CIR manager 10 has been described above in connection with the logging of a user's messages by the CIR manager 10. In addition to organization such as logging of messages, the CIR manager 10 may provide the user with information correlated to the messages. Advantageously, the correlated information may be useful to the user in connection with the messages. (Examples of information correlated to messages are also described above in connection with the message history or call history feature referenced in connection with FIG. 8.)

FIG. 13 is a flow diagram illustrating exemplary actions of the CIR manager 10 that may occur in the receipt of a call from Bill Jones for the user and including the provision of the additional correlated information to the user. After start action 280, a telephone call from Bill Jones for the user arrives at the switch serving the user in action 282. Generally, the switch is likely to be a service switching point (SSP) and an element of an advanced intelligent network (AIN) of the PSTN 38. Also, the switch is likely to be the switch serving the telephone line of the user and associated with the CIR manager 10.

During set-up of the CIR manager 10 for the user, the switch may be provisioned with a terminating attempt trigger (TAT) with regard to the user's telephone number. If the switch receives a call directed to the user's telephone number, the presence of the TAT trigger causes the switch to pause in the processing of the call. During the pause, the switch may engage in a query/response exchange with another element in the PSTN 38 such as a service control point (SCP) for instructions on how to handle the call. During set-up of the CIR manager 10 for the user, the SCP may be provided with instructions on how calls to the user's telephone number are to be handled. As a result, the SCP may provide the switch with instructions such as to provide information relating to the call to a telecom manager 40 in the PSTN 38. In action 284 of FIG. 13, the switch interacts with the telecom manager 40 to provide the call information. The call information may include: called number, calling number, name of called party, name of calling party, etc.

Also during set-up of the CIR manager 10 for the user, the telecom manager 40 in the PSTN 38 may have been provisioned with information relating to the user. This provisioning may have included an inclusion of data related to the user such as the user's name, address, telephone number, e-mail address, etc. In response to receipt of the call information from the switch, the telecom manager 40 may convert the call information into a data message that may be interpreted by the CIR manager 10 of the user. In action 286 the telecom manager 40 provides the data message of the call information to the CIR manager 10. For example, assume the user is using the CIR manager 10 in a PC 24 connected to the Internet 26. The telecom manager 40 transmits the data message over the Internet 26 to the user's PC 24 where the data message is received by the CIR manager 10.

In response to receipt of the data message of the call information, the CIR manager 10 may log the data message or other information related to the call for the user as indicated by action 287. The logging of information related to communications to a user are discussed above in connection with FIGS. 5A and 5B. In addition, the CIR manager 10 may provide the user with an indicator (audible, visible or both) regarding the call. For example, the CIR manager 10 may make the data message available to the user for review as message information. The message information may include part or all of the data message or the call information. The CIR manager 10 may present the message information in a GUI to the user as noted in action 288 in FIG. 13. For example, with respect to a telephone call received for the user, the CIR manager 10 may present the following message information on the display of the user's PC: "Telephone call received from Bill Jones calling from 404-332-2112." As another example, the reader is referred to the incoming call box 246 described above in connection with FIG. 10.

As noted, the data message may be used by the CIR manager 10 to present message information to the user on the user's PC 24. The data message also may be used by the CIR manager 10 to obtain information correlated to the communication received for the user. The correlated information may include message history regarding messages to/from the calling party or to/from the calling number. The correlated information need not be restricted to call information. The correlated information may include histories of other types of messages to/from the calling party or to/from the calling number. The correlated information also may include information selected by the user for correlation to messages received from the specific caller, from the specific calling number or source, or received on a specific day or during a specific time, etc. Further, the correlated information may include: reference to or presentation of a website accessed over the Internet or otherwise, additional information on the caller such as a vCard related to the caller, list of dates or appointments from a calendar and related to the caller, and other personal information related to the caller.

For example, the CIR manager 10 may use the data message relating to the telephone call from Bill Jones to obtain information about previous telephone calls received from or made to the calling number, or from or made to Bill Jones. In particular, assume the CIR manager 10 uses the name of Bill Jones as provided in the data message to check storage, directories, calendars, logs, tables, external resources, etc. for correlated information related to the telephone call. The CIR manager 10 may obtain information that the user has called Bill Jones by using Bill Jones' telephone number and mobile phone number. The CIR manager 10 also may obtain information that the user has e-mailed Bill Jones. The CIR manager 10 may present the information relating to the calls and e-mails as correlated information relating to the telephone call received from Bill Jones. The correlated information may be presented in a GUI to the user. The correlated information may be presented to the user in summary form such as by an entry or record including a date, time, type, length of previous communication, priority of communication, etc.

Further, the correlated information may provide the user with the substance of a previous communication directly or through the summary form pertaining to the previous communication. For example, assume the user has previously sent an e-mail to Bill Jones. The CIR manager 10 may obtain correlated information relating to this e-mail and provide the correlated information in summary form to the user by notifying the user of the previous e-mail through identification of its type, date, time, source, destination, priority, etc. If the user chooses to do so, the user may activate the summary form of the additional correlated information to obtain the substance of the e-mail. Advantageously, the user may peruse the substance of an e-mail sent to Bill Jones prior to or while taking the telephone call from Bill Jones.

In the exemplary embodiment at action 290 of FIG. 13, the CIR manager 10 offers the user the option of reviewing correlated information relating to the received message. In other words, in the exemplary embodiment, the CIR manager 10 does not automatically present the user with information correlated to the received communication, but rather, requests whether such correlated information should be presented to the user. The offer made by the CIR manager 10 to present correlated information is a feature the user may customize to his or her own preference. Some users may prefer the correlated information always to be automatically presented; other users may prefer to be asked about presentation of the correlated information; and yet other users may not ever be interested in having correlated information or being asked about the presentation of correlated information.

In action 292, FIG. 13, the CIR manager 10 checks whether the user has positively or negatively responded to the presentation of the correlated information. If the response is positive, then in action 294 the CIR manager 10 displays the correlated information. If the response is negative, then the CIR manager 10 does not display the correlated information.

The presentation of correlated information is described in the previous paragraphs as one of the features of the exemplary CIR manager 10 made in response to receipt of a message for the user. The user, however, has choices with respect to the handling of the communication itself. The choices for call handling may include: automatically responding to the call with a standard response such as a prerecorded message; responding to the message with a selected response such as a response selected from a variety of prerecorded messages; ignoring the call; taking the call; forwarding the call to voice mail; adding the call to a conference call; or playing an on-hold message to the call. The CIR manager 10 generally implements the choice of the user directly or through the gateway 28 in the Internet 26, in connection with the telecom manager 40 in the PSTN 38, or otherwise. Further, the CIR manager 10 generally keeps track of how the communication was handled by entry of the relevant information into a call log or table. The entry may be correlated to any other information related to the communication, caller, calling number, date, etc.

After the call has been handled, the CIR manager 10 may present the user with a follow-up box for further actions related to the communication. The follow-up box may include actions such as described above in connection with the follow-up conference call box 270 of FIG. 12. The actions may include sending a follow-up e-mail, sending a follow-up voice message, sending a follow-up fax, sending a reminder call, reserving a conference bridge, no action, and other actions. In action 296 of FIG. 13 the CIR manager 10 checks whether any follow-up action is to be taken with respect to the call. If so, then the CIR manager 10 in action 298 causes the follow-up action to be taken. After the follow-up action has been taken or after the CIR manager determines that no follow-up action is to be taken, the CIR manager 10 may keep track of the follow-up or lack of follow-up by entry of the relevant information into a call log or table. The entry may be correlated to any other information related to the communication, caller, calling number, date, etc. The process ends in action 300.

Exemplary actions of the CIR manager 10 in connection with the receipt of a message for the user are described above in connection with FIG. 13 by reference to an example of a telephone call received for the user. But the actions of the CIR manager 10 are not limited to this example. As noted, the messages and communications received by a user may be of different types, and responses to the receipt of such communications provided by the CIR manager 10 may have different action features than those described above. The CIR manager 10 presents action features and different information presentations as appropriate to the type of communication or message being handled.

Figure 14:
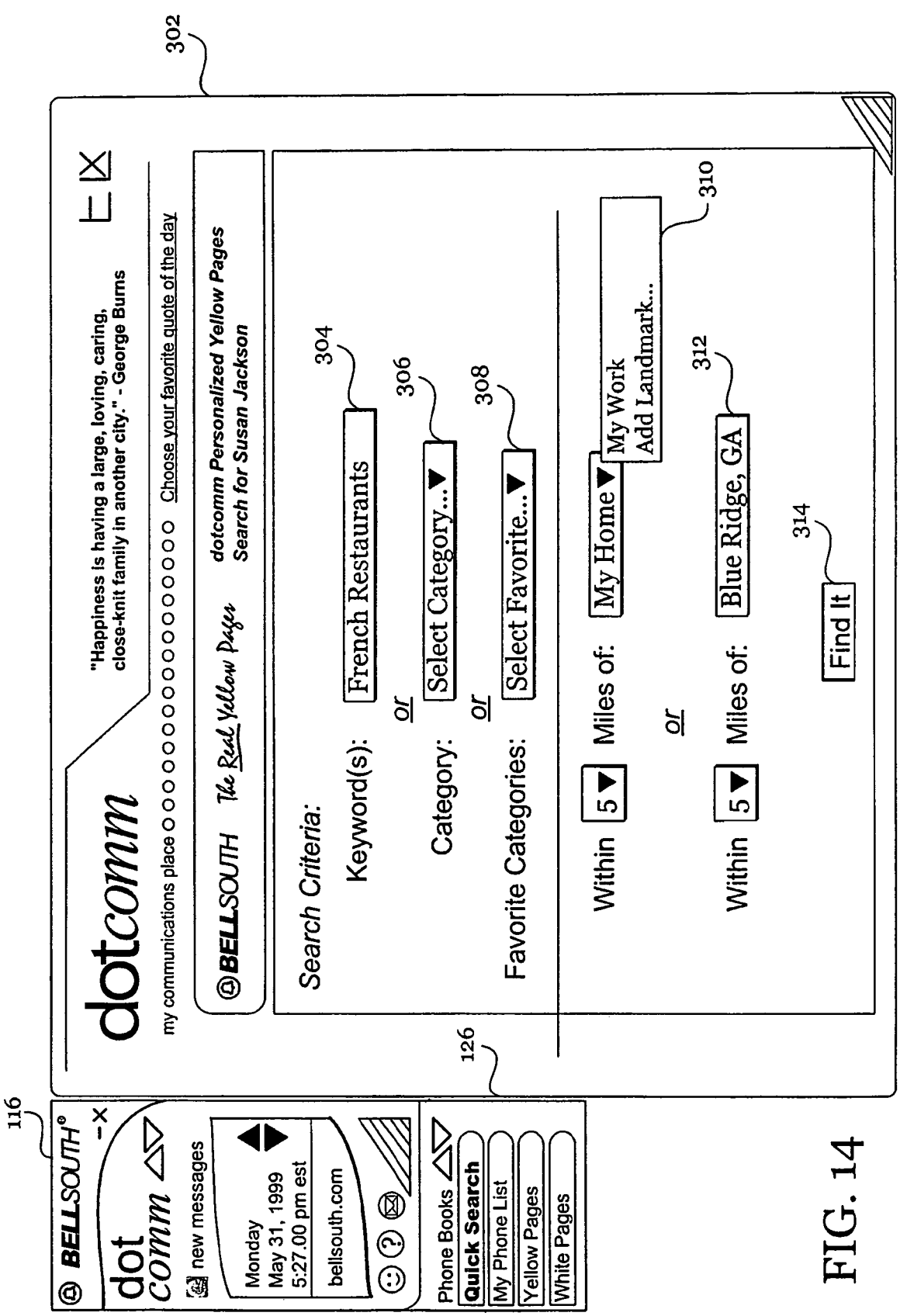
FIGS. 14, 15, and 16 illustrate, respectively, exemplary screens of a computer displaying information presentations of an exemplary CIR manager.
Figure 15:
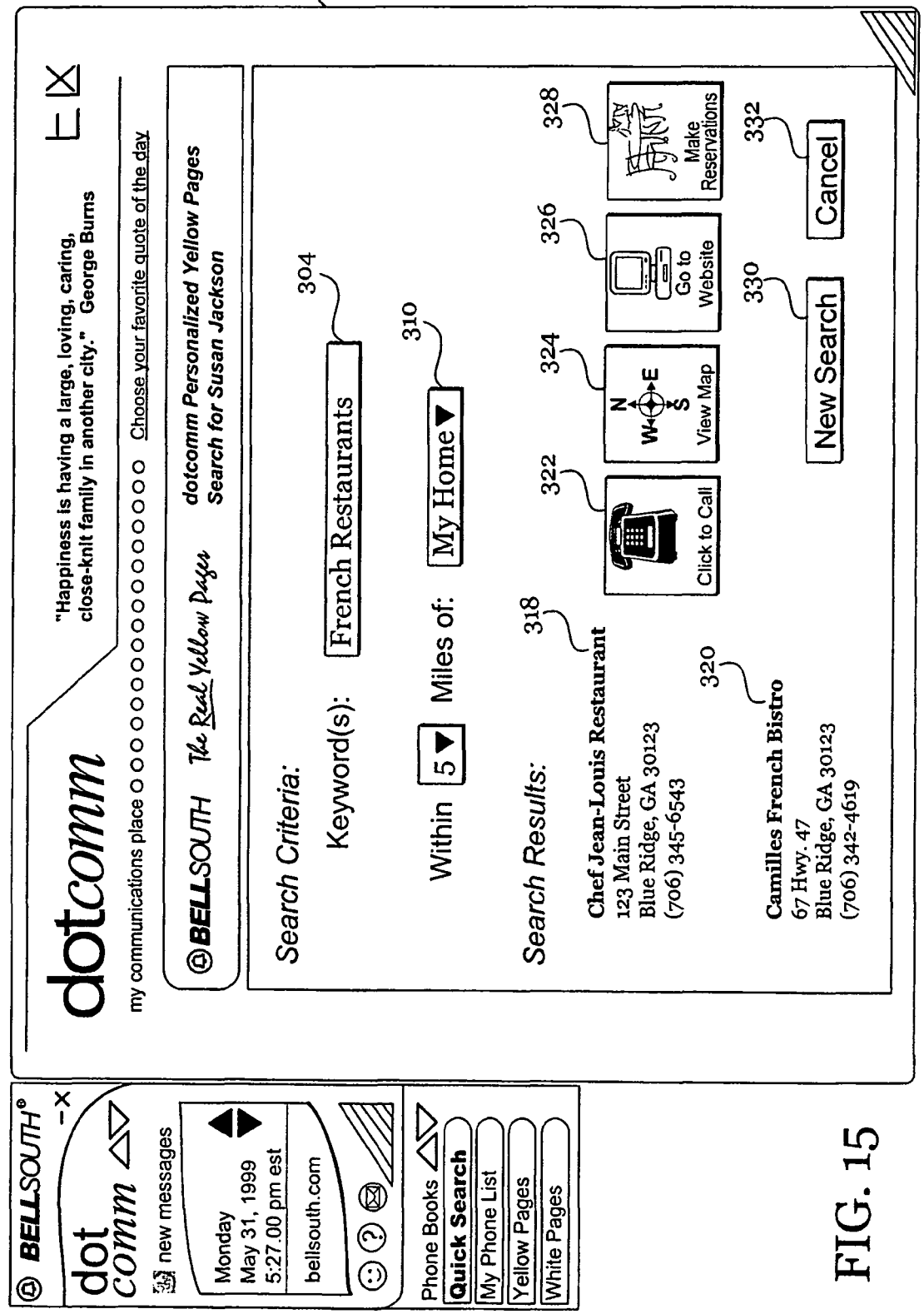
Figure 16:
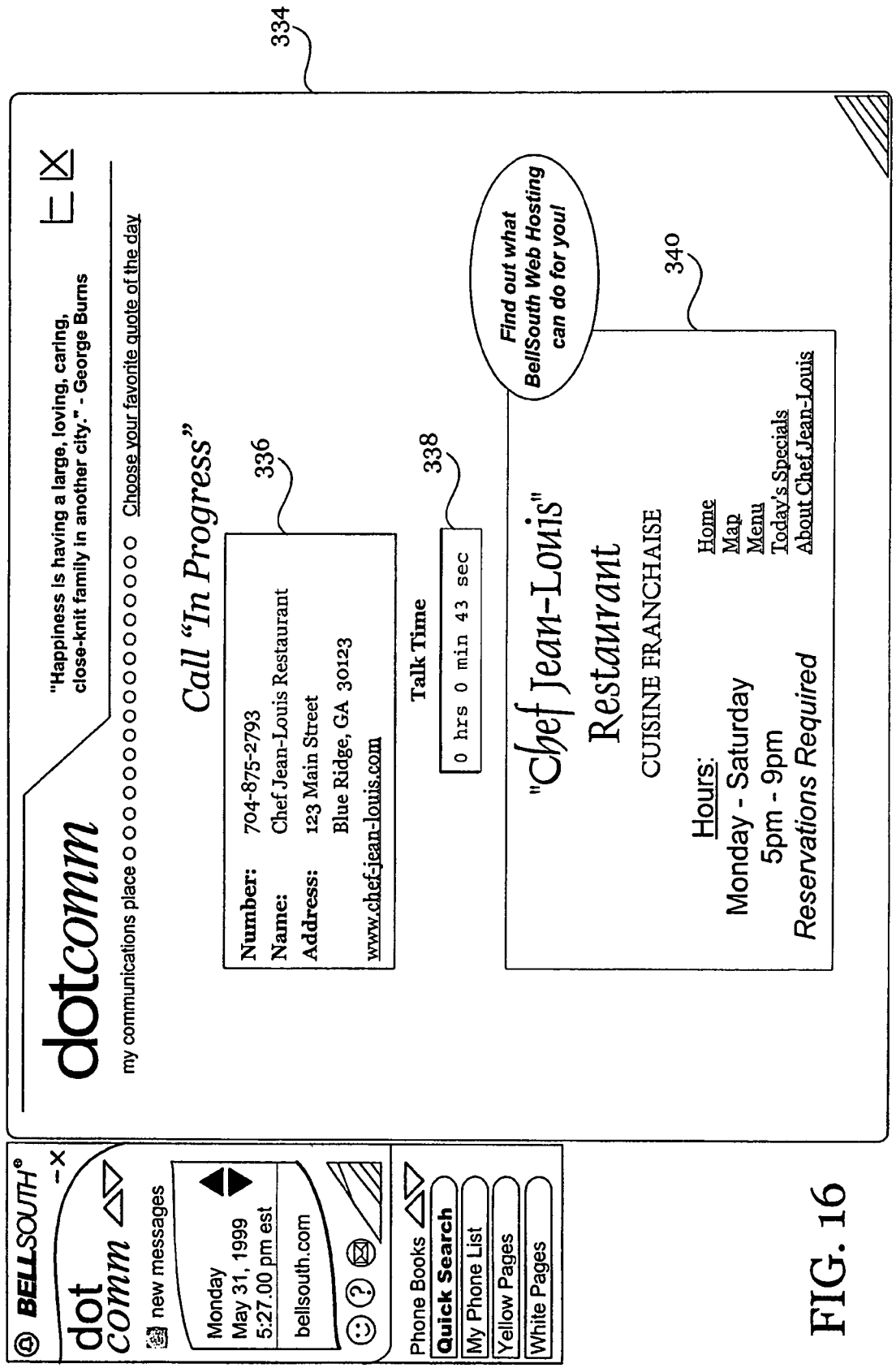

Retrieval of Information—FIGS. 14-16

In addition to its functions related to a user's communications, the CIR manager 10 may be used to retrieve information from information resources of the CIR manager 10 and/or other elements to which the CIR manager 10 has access directly or through other devices, systems, and networks. To make use of these retriever functions, generally the user provides a description of the information he or she is seeking. The description may be provided through the provision of search criteria and may include a keyword(s). The description may be provided in other ways. For example, the CIR manager 10 may provide the user with lists of search criteria such as lists of categories of information.

Once the description of the sought-after information is provided, the CIR manager 10 acts to obtain the information. As noted, the CIR manager 10 may consults its own resources such as databases, tables, calendars, address books, etc. In addition, the CIR manager 10 may consult with information resources available over the Internet 26, the PSTN 38, or other systems or networks. The search may be conducted with respect to more than one information resource. Once the sought-after information is obtained, then the CIR manager 10 presents the information to the user. Typically, the presentation may be through use of a GUI displayed on the user's computer screen.

FIGS. 14-16 illustrate screen displays of an exemplary search by a user named Susan Jackson for a French restaurant located within five miles of her home or a designated location. Referring to FIG. 14, in this example, the user has elected to use the dotcomm icon 116 displayed on his or her computer screen, and specifically, has elected to search a resource referred to as the "Yellow Pages". To search this resource, the user clicks on the button labeled "Yellow Pages" 126 displayed on the dotcomm icon 116. In response, a GUI 302 relating to the search is presented to the user on the computer screen.

The search GUI 302 includes fields for the provision of the search criteria or description of the sought-after information. As illustrated in FIG. 14, the user may supply the search criteria in a number of different ways. The user may supply a keyword(s) to search such as the illustrated "French Restaurants" field 304. The user may select a category from a list of categories as illustrated by the "Select Category . . . " field 306. The user may select a favorite category for the search from a list of favorite categories as illustrated by the "Select Favorite . . . " field 308. Advantageously, as illustrated in FIG. 14, the search for a French Restaurant may be narrowed to criteria specified by the user. The user may specify the French Restaurant be located within a certain number of miles (such as the illustrated five miles) from her home (or other designated landmark) as illustrated by the "My Home" field 310. Alternatively, the user may specify the French Restaurant be located within a certain number of miles (such as the illustrated five miles) from a location such as the illustrated Blue Ridge, Ga. field 312. Once the search criteria have been supplied, the user may initiate the search by clicking-on the button labeled "Find It" 314 in the search GUI 302.

In response to the initiation of the search, the CIR manager 10 may conduct or cause the search to be conducted. In this example, the initial part of the search is of the information resource referred to as the "Yellow Pages". The CIR manager 10 may contact the information resource through the Internet 26, the PSTN 38, or in other ways. In response to the contact, the CIR manager 10 may obtain search results including a listing of all of the French Restaurants in the information resource. For each listing, the address may be included. But, as noted above, the user desires to limit the search to French Restaurants located within five miles of her home or within five miles of Blue Ridge, Ga. In some cases, the information resource such as the Yellow Pages contacted by the CIR manager 10 may be able to provide results to the narrowed search as well as the broader search. In this example, assume the Yellow Pages is unable to narrow the search results. Instead, the CIR manager 10 may obtain the listing of all of the French Restaurants in the Yellow Pages resource. The CIR manager 10 may use some feature of the location of the user's home (such as its zip code) to sort the results from the Yellow Pages resource. The sorting of the search results by zip code allows the CIR manager 10 to narrow the search results to only French Restaurants located within the user's zip code area.

To further narrow the search results, the CIR manager 10 may consult another information resource such as a map service. The CIR manager 10 may provide the map service with the narrowed search results including only French Restaurants located within the user's zip code area. The CIR manager 10 also may provide the map service with the user's home address. The map service may compare the user's home address with the addresses of the listing of the French Restaurants located within the user's zip code to further narrow the search results to those French Restaurants which are located within the user's zip code and within five miles of the user's home. The final search results are returned to the CIR manager 10.

As illustrated in FIG. 15, the CIR manager 10 may display the final search results to the user in a GUI of search results 316. For convenience, the search results GUI 316 may include a display of the search criteria such as the illustrated Keyword(s): "French Restaurants" field 304 and the within 5 miles of "My Home" field 310.

In this example, there are two results of the search: an entry for the Chef Jean-Louis Restaurant 318 and an entry for the Camilles French Bistro 320. Each entry includes an address and telephone number for the user's reference. Advantageously, the CIR manager 10 includes features that anticipate the user's actions in following-up on the search. In this example, the CIR manager 10 determines the user may desire to take any of the following follow-up actions: call one or both of the restaurants; view a map with the location with one or both of the restaurants; access the website of one or both of the restaurants; make reservations at one or both of the restaurants; conduct a new search; or cancel the search function. To allow the user to take these actions with minimal further input, the CIR manager 10 provides buttons corresponding to these actions as follows: Click to Call 322; View Map 324; Go to Website 326; Make Reservations 328; New Search 330; and Cancel 332.

Assume the user has clicked-on the "Click to Call" button 322. In response, the CIR manager 10 causes a call to be made to the restaurant selected by the user. In addition to the call being made, the CIR manager 10 may provide the user with a presentation of information related to the call. FIG. 16 illustrates a call screen 334 including information related to the call to the Chef Jean-Louis Restaurant. The call screen 334 includes identification information 336 related to the restaurant such as the telephone number, name, address, and website of the restaurant. In addition, the call screen 334 includes information on the call to the restaurant such as a display of the duration of the call referred to as Talk Time 338. The call screen 334, in this example, also includes a presentation of the home page 340 of the restaurant's website. The restaurant's home page 340 includes additional information related to the restaurant as well as links to other pages of the restaurant's website.

The retrieval function of the CIR manager 10 is described above as if the CIR manager 10 conducts each of the actions related to the retrieval function. But the CIR manager 10 may cause such actions to take place, or may call or coordinate the actions related to the retrieval function through applications or programs of the CIR manager 10, or accessible to the CIR manager 10 through the Internet 26, the PSTN 38, or other systems or networks.

CONCLUSION

The exemplary embodiments of the inventions described herein were chosen and described in order to explain the principles of the inventions and their practical applications so as to enable others skilled in the art to utilize the inventions including various embodiments and various modifications as are suited to the particular uses contemplated. The examples provided herein in the written description or in the drawings are not intended as limitations of the inventions. Other embodiments will suggest themselves to those skilled in the art. Therefore, the scope of the inventions is to be limited only by the claims below.

The invention claimed is:

1. A method comprising:
   detecting an ongoing voice communication between a first participant and one or more additional participants;
   presenting, to the first participant and in association with the ongoing voice communication including the first participant and the one or more additional participants, a call in progress interface comprising identification information associated with the one or more additional participants of the ongoing voice communication and further comprising communication options associated with the ongoing voice communication;
   receiving an incoming voice communication intended for the first participant during the ongoing voice communication;
   presenting, to the first participant and without interrupting the ongoing voice communication, an incoming voice communication interface, the incoming voice communication interface comprising multiple selectable actions related to the incoming voice communication;
   detecting, during the ongoing voice communication, a selection of an action from among the multiple selectable actions of the incoming voice communication interface; and
   performing, using at least one processor and in response to the detected selection, the selected action with respect to the incoming voice communication.

2. The method of claim 1, wherein presenting, to the first participant and without interrupting the ongoing voice communication, the incoming voice communication interface comprises providing a pop-up indicator.

3. The method of claim 2, further comprising overlaying the pop-up indicator over at least a portion of the identification information presented in the call in progress interface.

4. The method of claim 2, further comprising:
   determining information related to the incoming voice communication; and
   presenting the information related to the incoming voice communication within the pop-up indicator.

5. The method of claim 4, wherein the information related to the incoming voice communication comprises an identity of a participant associated with the incoming voice communication.

6. The method of claim 4, wherein the information related to the incoming voice communication comprises an indication of a type of communication of the incoming voice communication.

7. The method of claim 6, wherein the type of communication of the incoming voice communication is different than a type of communication of the ongoing voice communication.

8. The method of claim 1, further comprising joining the incoming voice communication with the ongoing voice communication based on detecting the selection of the action from among the multiple selectable actions.

9. The method of claim 1, further comprising:
   determining a characteristic of the incoming voice communication; and
   based on the determined characteristic, identifying the multiple selectable actions to include in the incoming voice communication interface.

10. The method of claim 1, wherein performing the selected action comprises sending, to a participant associated with the incoming voice communication, a response message.

11. The method of claim 10, wherein the incoming voice communication is a first type of communication and the response message is sent via a second type of communication.

12. A non-transitory computer readable medium comprising instructions that, when executed by at least one processor, cause a computer device to:
   detect an ongoing voice communication between a first participant and one or more additional participants
   present, to the participant and in association with the ongoing voice communication including the first participant and the one or more additional participants, a call in progress interface comprising identification information associated with the one or more additional participants of the ongoing voice communication and further communication options associated with the ongoing voice communication;
   receive an incoming voice communication intended for the first participant during the ongoing voice communication;
   present, to the first participant and without interrupting the ongoing voice communication, an incoming voice communication interface, the incoming voice communication interface comprising multiple selectable actions related to the incoming voice communication;
   detect, during the ongoing voice communication, a selection of an action from the multiple selectable actions of the incoming voice communication interface; and
   perform, using at least one processor and in response to the detected selection, the selected action with respect to the incoming voice communication.

13. The non-transitory computer readable medium of claim 12, further comprising instructions that, when executed by the at least one processor, cause the computer device to:
   determine one or more characteristics of the incoming voice communication;
   associate a predefined response with the one or more characteristics; and identify, based on the determined one or more characteristics, the predefined response for the incoming voice communication.

14. The non-transitory computer readable medium of claim 13, further comprising instructions that when executed by the at least one processor, cause the computer device to send the predefined response to a participant associated with the incoming voice communication.

15. The non-transitory computer readable medium of claim 14, further comprising instructions that, when executed by the at least one processor, cause the computer device to provide an option to the first participant to customize the predefined response.

16. The non-transitory computer readable medium of claim 12, wherein the instructions cause the computer device to perform the selected action in response to the detected selection by:
    terminating the ongoing voice communication; and
    accepting the incoming voice communication.

17. The non-transitory computer readable medium of claim 16, further comprising instructions that, when executed by the at least one processor, cause the computer device to:
    determine that the ongoing voice communication has terminated; and
    present, to the first participant and via the call in progress interface, one or more additional options to communicate with a participant associated with the incoming voice communication.

18. A system comprising:
    at least one processor; and
    at least one non-transitory computer readable storage medium storing instructions thereon that, when executed by the at least one processor, cause the system to:
    detect an ongoing voice communication between a first participant and one or more additional participants;
    present, to the first participant and in association with the ongoing voice communication including the first participant and the one or more additional participants, a call in progress interface comprising identification information associated with the one or more additional participants of the ongoing voice communication and further comprising communication options associated with the ongoing voice communication;
    receive an incoming voice communication intended for the first participant during the ongoing voice communication;
    present, to the first participant and without interrupting the ongoing voice communication, an incoming voice communication interface, the incoming voice communication comprising multiple selectable actions related to the incoming voice communication;
    detect, during the ongoing voice communication, a selection of an action from among the multiple selectable actions of the incoming voice communication interface; and
    perform, using at least one processor and in response to the detected selection, the selected action with respect to the incoming voice communication.

19. The system of claim 18, further comprising instructions that, when executed by the at least one processor, cause the system to overlay a pop-up indicator over at least a portion of the identification information presented in the call in progress interface.

20. The system of claim 19, further comprising instructions that, when executed by the at least one processor, cause the system to;
    determine a characteristic of the incoming voice communication; and
    based on the determined characteristic, identify the multiple selectable actions to include in the incoming voice communication interface.

* * * * *